United States Patent
Lablans

(10) Patent No.: US 8,046,661 B2
(45) Date of Patent: Oct. 25, 2011

(54) SYMBOL ERROR CORRECTION BY ERROR DETECTION AND LOGIC BASED SYMBOL RECONSTRUCTION

(75) Inventor: Peter Lablans, Morris Township, NJ (US)

(73) Assignee: Temarylogic LLC, Morristown, NJ (US)

( * ) Notice: Subject to any disclaimer, the term of this patent is extended or adjusted under 35 U.S.C. 154(b) by 965 days.

(21) Appl. No.: 11/969,560

(22) Filed: Jan. 4, 2008

(65) Prior Publication Data

US 2008/0104479 A1    May 1, 2008

Related U.S. Application Data

(63) Continuation-in-part of application No. 11/680,719, filed on Mar. 1, 2007, now Pat. No. 7,865,807, and a continuation-in-part of application No. 10/935,960, filed on Sep. 8, 2004, now Pat. No. 7,643,632.

(60) Provisional application No. 60/779,068, filed on Mar. 3, 2006, provisional application No. 60/883,369, filed on Jan. 4, 2007.

(51) Int. Cl.
*H03M 13/00* (2006.01)
*G06F 11/00* (2006.01)

(52) U.S. Cl. ........ 714/757; 714/777; 714/781; 714/782; 714/784; 705/530; 705/531

(58) Field of Classification Search ............. 714/757, 714/777, 781, 782, 784; 708/530, 531
See application file for complete search history.

(56) References Cited

U.S. PATENT DOCUMENTS

| | | | | |
|---|---|---|---|---|
| 4,512,020 A * | 4/1985 | Krol et al. | ...... | 714/781 |
| 4,553,237 A * | 11/1985 | Nakamura | ...... | 714/778 |
| 4,928,280 A | 5/1990 | Nielson et al. | | |
| 5,386,425 A | 1/1995 | Kim | | |
| 5,771,245 A | 6/1998 | Zhang | | |
| 6,851,086 B2 | 2/2005 | Szymanski | | |
| 7,000,167 B2 | 2/2006 | Coker et al. | | |
| 7,116,250 B2 | 10/2006 | Coene | | |
| 7,493,547 B2 * | 2/2009 | Kim et al. | ...... | 714/758 |

OTHER PUBLICATIONS

Kaneko rt al., Array Codes Correcting a Cluster of Unidirectional Errors for Two-Dimensional Matrix Symbols, Nov. 3-5, 2003, IEEE. pp. 242-249.*
Williams et al., IEEE 802.16 Broadband Wireless Access Working Group, Jan. 18, 2001, IEEE, pp. 1-28.*
Pohlmann, Ken C., "The Compact Disc; a handbook of theory and use", *The Computer music and digital audio series*; vol. 5 A-R Editions, Inc. Madison, WI 1989, (1989), pp. 58-61.

(Continued)

*Primary Examiner* — John J Tabone, Jr.
(74) *Attorney, Agent, or Firm* — Diehl Servilla LLC

(57) ABSTRACT

Methods and apparatus for creating codewords of n-valued symbols with one or more n-valued check symbols are disclosed. Associating the codewords with a matrix allows for detection of one or more symbols in error and the location of such symbols in error. Methods to reconstruct symbols in error from other symbols not in error are also disclosed. Systems for using the methods of error detection and error correction by symbol reconstruction are also disclosed. Using two or more matrices to determine check symbols is also provided.

22 Claims, 9 Drawing Sheets

OTHER PUBLICATIONS

Rao, Wenjing et al., "Fault Tolerant Arithmetic with Applications in Nanotechnology Based Systems", *ITC International Test Conference*, (Oct. 26-28, 2004), pp. 472-478.

Wong, et al., "Using Multi-Dimensional Parity-Check Codes to Obtain Diversity in Rayleigh Fading Channels", URL: www.dsp.ufl.edu/-twong/Preprints/00965675.pdf, (2001), pp. 1210-1214.

Tee, et al., "Multilevel Generalised Low-Density Parity-Check Codes", *Electronics Letters*, vol. 42 No. 3, (Feb. 2006), 2 pages.

Sklar, Bernard, "A Primer on Turbo Code Concepts", *IEEE Communications Magazine*, (Dec. 1997), pp. 94-102.

Xilinx LogiCORE™, "Compatible Turbo Product Code Encoder v1.0", *IEEE 802.16, Product Specification*, (Oct. 30, 2002), 5 pages.

Valles, et al., "Hamming Codes Are Rat-Efficient Array Codes", *IEEE Globecom*, (2005), 1320-1324.

* cited by examiner

|      | col1 | col2 | col3 | col4 |
|------|------|------|------|------|
| row1 | d11  | d12  | d13  | q1   |
| row2 | d21  | d22  | d23  | q2   |
| row3 | d31  | d32  | d33  | q3   |
| row4 | p11  | p12  | p13  | q4   |
| row5 | p21  | p22  | p23  | q5   |

| tt1 | p1 | q1 | r1 | s1 |
| tt2 | p2 | q2 | r2 | s2 |
| tt3 | p3 | q3 | r3 | s3 |
| t1 | x1 | y1 | v1 | z1 |
| t2 | x2 | y2 | v2 | z2 |
| t3 | x3 | y3 | v3 | z3 |
| t4 | x4 | y4 | v4 | z4 |

| tt1 | p1 | q1 | r1 | s1 | cc1 |
| --- | --- | --- | --- | --- | --- |
| tt2 | p2 | q2 | r2 | s2 | cc2 |
| tt3 | p3 | q3 | r3 | s3 | cc3 |
| t1 | x1 | y1 | v1 | z1 | c1 |
| t2 | x2 | y2 | v2 | z2 | c2 |
| t3 | x3 | y3 | v3 | z3 | c3 |
| t4 | x4 | y4 | v4 | z4 | c4 |

SYMBOL ERROR CORRECTION BY ERROR DETECTION AND LOGIC BASED SYMBOL RECONSTRUCTION

CROSS-REFERENCE TO RELATED APPLICATIONS

This application is a continuation-in-part of U.S. patent application Ser. No. 11/680,719, filed on Jan. 3, 2007, which claims the benefit of U.S. Provisional Patent Application No. 60/779,068, filed Mar. 3, 2006, which are both incorporated herein by reference in their entirety. This application is a continuation-in-part of U.S. Non-Provisional patent application Ser. No. 10/935,960, filed on Sep. 8, 2004, entitled TERNARY AND MULTI-VALUE DIGITAL SCRAMBLERS, DESCRAMBLERS AND SEQUENCE GENERATORS, which is incorporated herein in its entirety. This application also claims the benefit of U.S. Provisional Application No. 60/883,369, filed Jan. 4, 2007, which is incorporated herein by reference in its entirety.

BACKGROUND OF THE INVENTION

The present invention relates to correction of one or more symbols in error in a sequence of symbols. More specifically, it relates to error correction by first identifying the location of possible errors, followed by reconstruction of the original symbols from the remaining symbols believed to be not in error.

Error correction of symbols is well known, especially in the field of communications and information storage or transfer. In general, a series of symbols that is being transferred may have experienced interference or noise on a transmission channel. Possibly the storage medium, such as an optical or magnetic disk, may have been damaged. As a consequence, a received sequence of symbols may be different from the sequence from which it originated. The difference between an original sequence of symbols and a received sequence may be considered to be errors.

Error control measures can be applied to detect and to correct errors. These measures in general comprise adding additional symbols to a sequence, based on the existing symbols in the original sequence. The redundancy of symbols allows for detection and sometimes correction of errors.

It usually requires a greater number of redundant symbols to correct errors rather than to merely detect that symbols are in errors. For instance, in data communications, wherein resending of information is possible and not detrimental to the quality of data transfer, it may be sufficient to detect errors and request the transmitter to resend the symbols. However, in many applications resending of symbols is impossible or undesirable. In such cases error correction is desirable.

Error-correction techniques for symbols in a sequence attempt to achieve the best result with as few redundant symbols as possible, and with as limited processing requirements and memory or storage requirements as possible. Error correcting redundancy is usually set to address some maximum or optimal expected symbol error ratio. If information is coded into codewords, it is to be expected that many codewords are error-free and in error-free codewords extra symbols provided for error correction or detection are truly redundant.

Effective error correcting codes with a possibility to correct a limited number of symbols in a sequence of a greater number of symbols require significant processing and/or memory capabilities. Maximum likelihood error correction may also require significant memory or storage capabilities.

Accordingly, novel and improved methods and apparatus providing improved error correcting performance with limited symbol redundancy and limited processing resources are required.

SUMMARY OF THE INVENTION

In accordance with one aspect of the present invention, presents a novel method and system are provided that will correct errors in a sequence of symbols by detecting which symbols are in error and then reconstructing the error symbol by reversible logic functions. An n-valued function herein means an n-valued logic function.

In accordance with another aspect of the present invention, a method is provided for error correction of one or more n-valued symbols in a codeword of a plurality of n-valued symbols with n>2, a codeword having at least one check symbol calculated from data symbols, using a plurality of codewords comprising recalculating a check symbol in a codeword, evaluating if a codeword has a symbol in error, determining a location of a symbol in error in a codeword based on check symbols of at least two codewords; and reconstructing the symbol in error.

In accordance with a further aspect of the present invention, the method has at least one check symbol generated by the n-valued logic expression using an n-valued non-adder function.

In accordance with a further aspect of the present invention, a method is provided for calculating check symbols by using an n-valued Linear Feedback Shift Register (LFSR).

In accordance with another aspect of the present invention a method is provided for the n-valued LFSR using an n-valued logic function defined in $GF(n=2^p)$ with $p \geq 1$.

In accordance with a further aspect of the present invention a method is provided for calculating a symbol known to be in error in a codeword from equations for determining one or more check symbols of the codeword.

In accordance with another aspect of the present invention, a method is provided for creating codewords comprising the steps of arranging the n-valued data symbols to be coded in a matrix; determining check symbols along the dimensions of the matrix; including the check symbols to codewords in the matrix; and completing coding of the n-valued data symbols as a frame of codewords.

In accordance with a further aspect of the present invention, a method is provided for decoding a frame of codewords comprising the steps of deconstructing the frame of codewords into a matrix; recalculating the check symbols as new check symbols from the data symbols; and determining data symbols in error by comparing the check symbols with the new check symbols.

In accordance with another aspect of the present invention, a method is provided for solving equations for determining check symbols for a codeword including data symbols in error, wherein the symbols in error are treated as unknowns for which the equations can be solved.

In accordance with a further aspect of the present invention, apparatus are provided that will implement the methods which are an aspect of the present invention.

In accordance with another aspect of the present invention systems are disclosed that provide error correction coding at the source and error correction decoding at the target in accordance with the methods of the present invention.

In accordance with a further aspect of the present invention data storage systems are provided that will correct symbol errors in symbols retrieved from a storage medium.

In accordance with another aspect of the present invention, a method is provided for error correction for a plurality of n-valued with n>2 data symbols, comprising associating the plurality of n-valued data symbols with a first 2-dimensional matrix, providing each n-valued data symbol with a position in the first matrix, generating a plurality of row check symbols along each row of data symbols in the first matrix, a row check symbol being generated by applying an n-valued logic expression wherein data symbols in a row of the first matrix are variables, generating a plurality of column check symbols along each column of data symbols in the first matrix, a column check symbol being generated by applying an n-valued logic expression wherein data symbols in a column in the first matrix are variables, and transmitting to a decoder the plurality of n-valued data symbols, and the pluralities of row and column check symbols.

In accordance with a further aspect of the present invention, the method has at least one check symbol generated by the n-valued logic expression using an n-valued logic function which is not a modulo-n adder or an adder over $GF(n)$.

In accordance with a further aspect of the present invention, the method further comprises receiving by the decoder the plurality of n-valued data symbols as received n-valued data symbols, and the pluralities of row and column check symbols as received row and column check symbols, associating the plurality of received n-valued data symbols with the first matrix, providing each received n-valued data symbol with a position in the first matrix, generating a plurality of recalculated row check symbols along each row of received data symbols in the first matrix, a recalculated row check symbol being generated by applying an n-valued logic expression wherein received data symbols in a row of the first matrix are variables, generating a plurality of recalculated column check symbols along each column of received data symbols in the first matrix, a recalculated column check symbol being generated by applying an n-valued logic expression wherein received data symbols in a column are variables, locating one or more symbols for error correction by applying only received and recalculated check symbols.

In accordance with another aspect of the present invention, the method further comprises error-correcting a symbol for error correction by applying an n-valued logic expression having the symbol for error correction as an unknown.

In accordance with a further aspect of the present invention, the method further comprises associating the plurality of n-valued symbols with a second 2-dimensional matrix, providing each symbol with a position in the second matrix, generating a plurality of row check symbols along each row of data symbols in the second matrix, a row check symbol being generated by applying an n-valued logic expression wherein data symbols in a row of the second matrix are variables, generating a plurality of column check symbols along each column of data symbols in the second matrix, a column check symbol being generated by applying an n-valued logic expression wherein data symbols in a column in the second matrix are variables, and adding to a transmission of symbols to the decoder the pluralities of row and column check symbols associated with the second matrix.

In accordance with another aspect of the present invention, the method further comprises receiving by the decoder the pluralities of n-valued data symbols as received n-valued data symbols and the pluralities check symbols as received check symbols, locating symbols for error correction in accordance with the first matrix, locating symbols for error correction in accordance with the second matrix, and determining symbols for error correction in accordance with the first and the second matrix.

In accordance with a further aspect of the present invention, the method further comprises applying check symbols generated in accordance with one or more additional matrices.

In accordance with another aspect of the present invention, the method is provided wherein a check symbol is generated by using an n-valued Linear Feedback Shift Register (LFSR).

In accordance with a further aspect of the present invention, the method further comprises generating one or more n-valued check symbols from the plurality of row symbols.

In accordance with a further aspect of the present invention, the method further comprises generating one or more n-valued check symbols from the plurality of column check symbols.

In accordance with a further aspect of the present invention, a system for error correction in a plurality of n-valued data symbols with n>2 is provided, comprising a coding unit for generating a plurality of check symbols from the plurality of n-valued data symbols, a check symbol being calculated from an n-valued expression having n-valued data symbols of a codeword as variables and wherein a codeword is formed by associating the plurality of n-valued data symbols with a first matrix and the codeword has n-valued data symbols of a row or a column of the first matrix, a decoding unit for generating a plurality of recalculated check symbols which are recalculated in accordance with the first matrix from the plurality of data symbols having one or more data symbols in error, an error locating unit for locating one or more symbols for error correction in the plurality of n-valued data symbols having one or more data symbols in error by using only check symbols and recalculated check symbols, an error correcting unit for calculating a correct value for a symbol for error correction by solving an equation using a reversible n-valued logic function and having a symbol for error correction as an unknown.

In accordance with a further aspect of the present invention, the system has at least one check symbol generated by the n-valued logic expression using an n-valued function which is not a modulo-n adder or an adder over $GF(n)$.

In accordance with a further aspect of the present invention, the system for error correction comprises the coding unit generating a second plurality of check symbols from the plurality of n-valued data symbols, a check symbol being calculated from an n-valued expression having n-valued data symbols of a codeword as variables and wherein a codeword is formed by associating the plurality of n-valued data symbols with a second matrix and the codeword has n-valued data symbols of a row or a column of the second matrix.

In accordance with a further aspect of the present invention, the system for error correction comprises the decoding unit generating a second plurality of recalculated check symbols which are recalculated in accordance with the second matrix from the plurality of data symbols having one or more data symbols in error.

In accordance with a further aspect of the present invention, the system for error correction comprises generating an additional plurality of check symbols from the plurality of n-valued data symbols, a check symbol being calculated from an n-valued expression having n-valued data symbols of a codeword as variables and wherein a codeword is formed by associating the plurality of n-valued data symbols with an additional matrix and the codeword has n-valued data symbols of a row or a column of the additional matrix.

In accordance with a further aspect of the present invention, the system for error correction comprises the coding unit generating additional check symbols from a plurality of check symbols.

In accordance with a further aspect of the present invention, the system for error correction comprises the decoder correcting errors in the check symbols.

In accordance with a further aspect of the present invention, the system for error correction is provided wherein the system is a data storage system.

In accordance with a further aspect of the present invention, the system for error correction is provided wherein the system is a communication system.

In accordance with a further aspect of the present invention, the system for error correction is provided wherein n-valued symbols are represented by binary symbols.

In accordance with a further aspect of the present invention, a method for coding a plurality of n-valued with n>2 data symbols is provided, comprising selecting a first plurality of n-valued symbols from the plurality of n-valued data symbols, generating a first n-valued check symbol from the first plurality of data symbols by using an n-valued logic expression using an n-valued reversible logic function, selecting a second plurality of n-valued symbols from the plurality of n-valued data symbols, generating a second n-valued check symbol from the second plurality of data symbols by using an n-valued logic expression using an n-valued reversible logic function, and the first and the second plurality of n-valued data symbols having at least one n-valued data symbol in common.

In accordance with a further aspect of the present invention, the method for coding a plurality of n-valued with n>2 data symbols comprises selecting an additional plurality of n-valued symbols from the plurality of n-valued data symbols, generating an additional n-valued check symbol from the additional plurality of data symbols by using an n-valued logic expression using an n-valued reversible logic function, repeating the previous steps until each of the plurality of n-valued data symbols is associated with at least two check symbols.

In accordance with a further aspect of the present invention, the method has at least one check symbol generated by the n-valued logic expression using an n-valued function which is not a modulo-n adder or an adder over GF(n).

DESCRIPTION OF A PREFERRED EMBODIMENT

Figure 1:
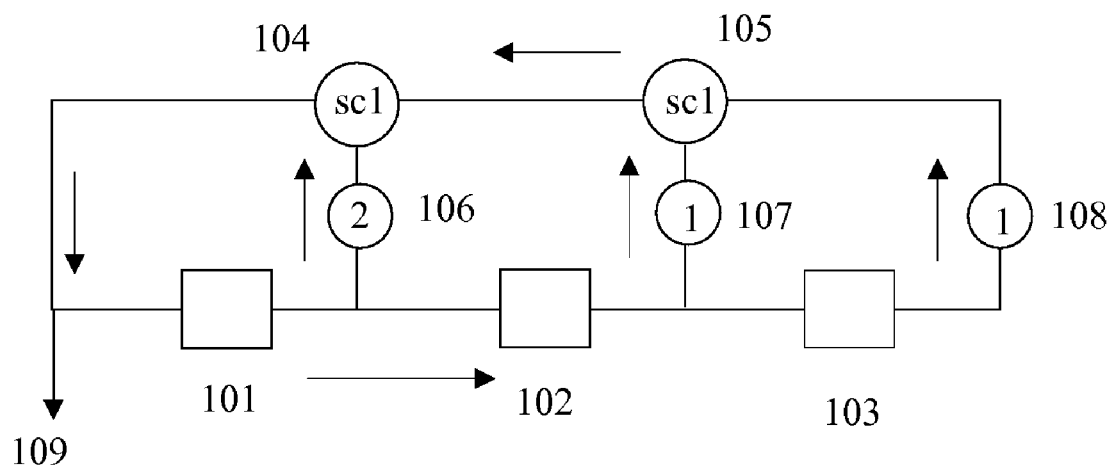
FIG. 1 is a diagram of an n-valued LFSR circuit with multipliers and is prior art.

According to one aspect of the present invention, several error detecting, check symbol generation and symbol reconstruction approaches for sequences including sequences of n-valued symbols will be combined.

N-valued herein will mean an integer equal to or greater than 3. It is distinguished from binary or 2-valued.

Furthermore, the terms state or value and multi-state or multi-valued will be used interchangeably. The logic functions that are provided herein represent the switching of states. A state may be represented by a digit or a number. This may create the impression that an actual value is attached to a state. One may, to better visualize states, assign a value to a state. However, that is not a requirement for a state. A name or designation of a state is just to indicate that it is different from states with different designations. Because some logic functions herein represent an adder the names state and value may be used meaning the same.

Furthermore, because of the practice in binary logic to represent a state by a physical level of a signal such as a voltage, one often assumes that different n-state signals have different levels of a signal, such as voltage or intensity. While such representations of a state are allowed it is not limited to that. A state may be represented by independent phenomena. For instance, different states of a signal may be represented by different wavelengths of an optical signal. A state may also be represented by a presence of a certain material, by a quantum-mechanical phenomenon, or by any other phenomenon that can distinguish a state from another state.

Furthermore, a symbol, which is regarded herein as a single element, may also be represented by 2 or more p-state symbols wherein p<n. For instance, a 4-state symbol may be represented by 2 binary symbols.

The generation of check symbols, especially in sequences of binary symbols, is known, and either a parity symbol or a combination of symbols representing a checksum is generated. One may also generate n-valued check symbols by applying n-valued symbols to one or more n-valued logic functions.

As an illustrative example to describe one aspect of the present invention assume a set of codewords of 5 n-valued symbols. All possible codewords of 5 n-valued symbols have at most 4 symbols in common. Having symbols in common in codewords is assumed to mean having symbols in common in like positions. For instance the word [0 1 2 3 4] and the word [3 2 1 0 4] have only one symbol (the 4) in common in like positions.

Assume that one can add to each codeword of 5 n-valued symbols 2 n-valued symbols in such a way that each codeword (of now 7 symbols) still have at most 4 symbols in common with another codeword. Now assume that a codeword of 7 symbols is transmitted to a receiver. Before or during reception an error may have occurred in one of the 7 symbols. This means that 6 symbols are correct and one symbol is in error. The received codeword has then 6 symbols in common with the correct codeword. Because each codeword has at most 4 symbols in common with each other codeword and assuming that an error has occurred in one symbol the codeword did not have in common with another codeword, then a codeword with one error has at most 5 symbols in common with any other codeword than the correct codeword. A codeword with 2 errors has at most 6 symbols in common with any other codeword except the correct codeword. It may also have just 5 symbols in common with the correct codeword. It should be clear that with 3 errors it will be possible that a codeword with errors may have 7 symbols in common with a codeword not being the correct codeword.

One may then conclude that a set of codewords of p+k symbols of which each codeword has at most q symbols in common with another codeword has a difference of at least p+k−q symbols between each codeword. And at most p+k−q−1 symbols in errors can be detected. The problem is that one can usually only determine (detect) that up to (p+k−q−1) symbols are in error in a codeword. In general one can not determine which of the p+k symbols are in error. It is known that twice as many redundant symbols are required to also correct the symbols in error.

In general, error correction also requires the application of some decoding scheme. For instance, one can apply convolutional coding and attempt to create a maximum likelihood Trellis for decoding. One may also code the words according to a Reed Solomon scheme and correct any errors by solving equations based on syndromes.

A preferred embodiment as one aspect of the present invention, is to first identify which symbols in a sequence are in error, and based on a selected coding scheme reconstruct the symbols that were detected as being in error by using reversing equations. The advantage is that the decoding can be done in a fast and simple manner.

Reconstruction of symbols (including n-valued symbols) in error based on known correct symbols has been demonstrated by the Applicant in U.S. patent application Ser. No. 11/566,725, filed on Dec. 5, 2006 entitled ERROR CORRECTING DECODING FOR CONVOLUTIONAL AND RECURSIVE SYSTEMATIC CONVOLUTIONAL ENCODED SEQUENCES, which is incorporated herein in its entirety by reference. Reconstruction of symbols in error in Reed Solomon codes and in what the Applicant calls Reed-Solomon like codes also are described in U.S. Non-provisional patent application Ser. No. 11/739,189, filed on Apr. 24, 2007, which claims the benefit of U.S. Provisional Patent Application Ser. No. 60/807,087 filed Jul. 12, 2006; U.S. Non-provisional patent application Ser. No. 11/743,893, filed on May 3, 2007, which claims the benefit of U.S. Provisional Patent Application Ser. No. 60/821,980 filed Aug. 10, 2006, which are all four incorporated herein by reference in their entirety.

A reconstruction approach will be briefly explained in this section. As an example a 4-valued Reed Solomon code will be generated of 3 4-valued data symbols. A known 4-valued Linear Feedback Shift Register (LFSR) configuration that is able to generate the code is shown in FIG. 1. It should be noted that the coder is shown in Fibonacci configuration. An equivalent LFSR coder in Galois configuration can also be constructed. The rules for creating equivalent n-valued Fibonacci and Galois LFSR based configurations are disclosed by the Inventor in U.S. Non-provisional patent application Ser. No. 11/696,261, filed on Apr. 4, 2007, and which claims the benefit of U.S. Provisional Patent Application Ser. No. 60/789,613, filed on Apr. 5, 2006 which are both incorporated herein in their entirety. It is understood for those skilled in the art that when a Fibonacci configuration LFSR is shown, that an equivalent Galois configuration of that LFSR is implicitly disclosed. Galois configurations of LFSRs can inherently be faster than Fibonacci configurations.

The coder as shown in FIG. 1 is comprised of an LFSR with a 3 element shift register with elements 101, 102 and 103, each of which can store a 4-valued symbol. Not shown, but assumed is a clock signal that will advance or shift the content of each element one position to the right. The first element 101 will assume the symbol that is also outputted on output 109 on the occurrence of a clock pulse. The content of the last element 103 will be lost after a clock pulse. The output of each shift register element is also provided to a 4-valued multiplier; that is: the output of 101 is also provided to a 4-valued multiplier factor 2 106, the output of 102 is also provided to a multiplier factor 1 107 and the output of 103 is provided to a 4-valued multiplier 108 representing a factor 1. The signals outputted by the multipliers are inputted to 4-valued adding function sc1.

In order to generate a 4-valued codeword of 5 symbols, the shift register is initiated with the 3 data symbols and the coder will be run for 2 clock pulses, generating 2 additional (redundant) symbols that will be joined with the three symbols to a codeword of 5 4-valued symbols.

The 4-valued multipliers and the 4-valued adder sc1 are defined over an extended binary Finite Field $GF(2^2)$. The truth table of the adder and the multiplier are provided in the following tables.

| + | 0 | 1 | 2 | 3 |
|---|---|---|---|---|
| 0 | 0 | 1 | 2 | 3 |
| 1 | 1 | 0 | 3 | 2 |
| 2 | 2 | 3 | 0 | 1 |
| 3 | 3 | 2 | 1 | 0 |

| × | 0 | 1 | 2 | 3 |
|---|---|---|---|---|
| 0 | 0 | 0 | 0 | 0 |
| 1 | 0 | 1 | 2 | 3 |
| 2 | 0 | 2 | 3 | 1 |
| 3 | 0 | 3 | 1 | 2 |

For reconstruction purposes, one would need to reverse the functions in the decoding process. The inventor has shown in U.S. patent application Ser. No. 10/935,960, filed Sep. 8, 2004, entitled TERNARY AND MULTI-VALUE DIGITAL SCRAMBLERS, DESCRAMBLERS AND SEQUENCE GENERATORS, which is incorporated herein by reference in its entirety, how to create n-valued functions having no multipliers, equivalent to n-valued functions having n-valued multipliers or inverters at its inputs. For several reasons, it is easier to use n-valued functions using no multipliers. However, it may be easier to do calculations with adders and multipliers. In accordance with a further aspect of the present invention one may do all calculations with adders and multipliers, but implement all functions in reduced form, using no multipliers.

Figure 2:
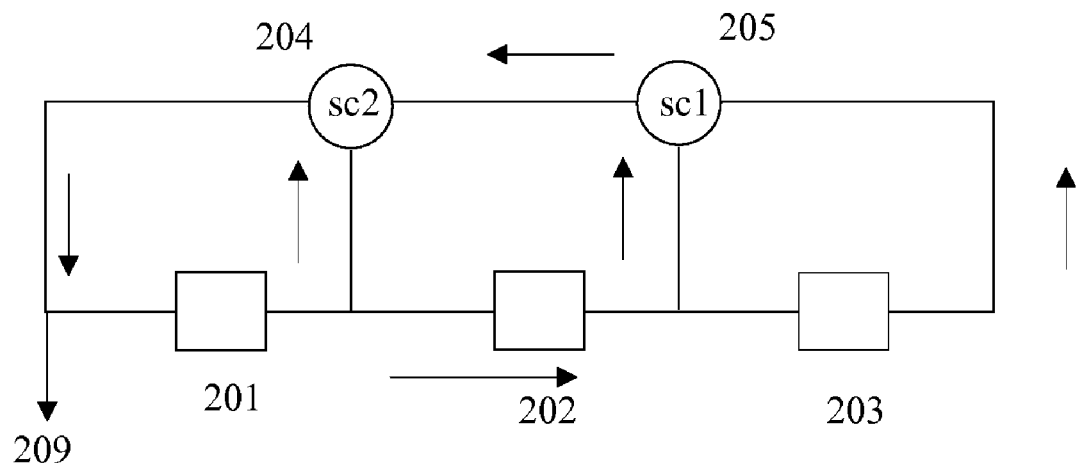
FIG. 2 is a diagram equivalent to the LFSR circuit of FIG. 1 having no multipliers.

The configuration equivalent to the one of FIG. 1 is shown in FIG. 2. Herein no multipliers are used. The generated redundant symbols are provided on output 209. There is still a shift register with elements 201, 202 and 203. However, the multipliers and adders are combined into functions sc2 (204)

and adder sc1 (205). Because multipliers 107 and 108 in FIG. 1 are a factor 1, the function 205 in FIG. 2 is identical to function 105 in FIG. 1. The function sc2 (204) in FIG. 2 is the adder sc1 modified by a multiplier 2. The truth table of sc2 is provided in the following table.

| sc2 | 0 | 1 | 2 | 3 |
|---|---|---|---|---|
| 0 | 0 | 1 | 2 | 3 |
| 1 | 2 | 3 | 0 | 1 |
| 2 | 3 | 2 | 1 | 0 |
| 3 | 1 | 0 | 3 | 2 |

Accordingly, one can create a set of 64 different codewords of 5 4-valued symbols using the coder of FIG. 2 wherein each codeword has at most 2 symbols in common with another codeword from the set. The following table shows part (50%) of the generated set of codewords.

| data | | | redun | | data | | | redun | |
|---|---|---|---|---|---|---|---|---|---|
| 0 | 0 | 0 | 0 | 0 | 3 | 0 | 0 | 1 | 1 |
| 0 | 0 | 1 | 1 | 2 | 3 | 0 | 1 | 0 | 3 |
| 0 | 0 | 2 | 2 | 3 | 3 | 0 | 2 | 3 | 2 |
| 0 | 0 | 3 | 3 | 1 | 3 | 0 | 3 | 2 | 0 |
| 0 | 1 | 0 | 1 | 3 | 3 | 1 | 0 | 0 | 2 |
| 0 | 1 | 1 | 0 | 1 | 3 | 1 | 1 | 1 | 0 |
| 0 | 1 | 2 | 3 | 0 | 3 | 1 | 2 | 2 | 1 |
| 0 | 1 | 3 | 2 | 2 | 3 | 1 | 3 | 3 | 3 |
| 0 | 2 | 0 | 2 | 1 | 3 | 2 | 0 | 3 | 0 |
| 0 | 2 | 1 | 3 | 3 | 3 | 2 | 1 | 2 | 2 |
| 0 | 2 | 2 | 0 | 2 | 3 | 2 | 2 | 1 | 3 |
| 0 | 2 | 3 | 1 | 0 | 3 | 2 | 3 | 0 | 1 |
| 0 | 3 | 0 | 3 | 2 | 3 | 3 | 0 | 2 | 3 |
| 0 | 3 | 1 | 2 | 0 | 3 | 3 | 1 | 3 | 1 |
| 0 | 3 | 2 | 1 | 1 | 3 | 3 | 2 | 0 | 0 |
| 0 | 3 | 3 | 0 | 3 | 3 | 3 | 3 | 1 | 2 |

The data symbols are in the columns under data. The redundant symbols are in the columns under 'redun' in the table. It should be clear that combination of the redundant symbols with the data symbols is trivial. They can be put before or after (as in the table) the data symbols. The order of the symbols can be changed or the redundant symbols can be inserted between the data symbols. However, no matter how the redundant symbols are combined with the data symbols, it should be done in an identical fashion for all the codewords.

Figures 3, 4:
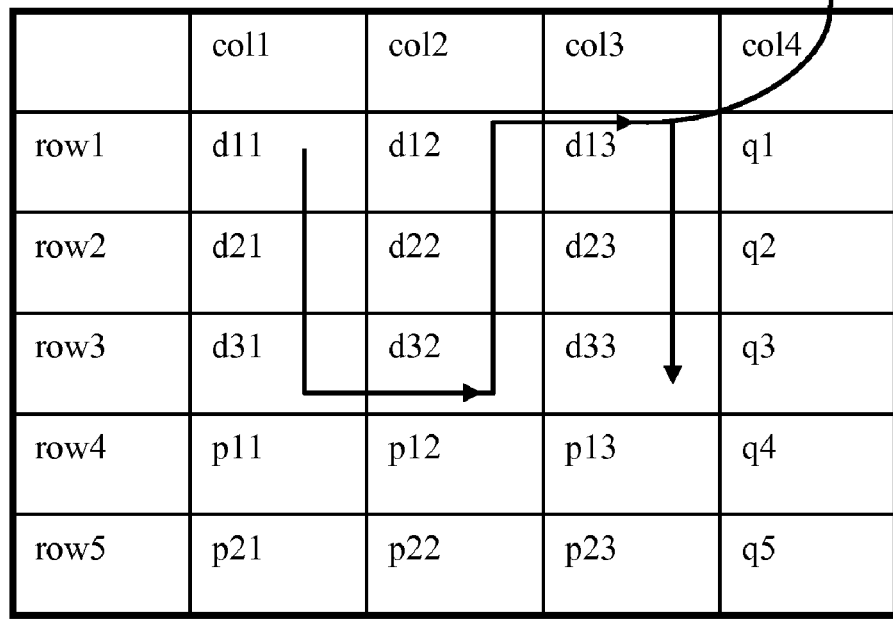
FIG. 3 is a matrix showing codewords with data symbols and check symbols.
FIG. 4 is another matrix showing codewords with data symbols and check symbols.

One can arrange the data symbols of codewords in a matrix and calculate the redundant symbols over the dimensions of the matrix. An example is shown in FIG. 3 wherein the symbols are arranged in a 2-dimensional matrix. For illustrative purposes, 2 dimensional matrices will be used. However, the matrices can also be arranged in three dimensional or higher dimensional matrices. Furthermore, the matrices do not have to be square or rectangular. For instance one may fold a sequence of n-valued symbols as a series of columns of a matrix, wherein a the end of a previous column is connected to the end of the next column, as for instance shown in FIG. 4 by line 401. In that case errors may spill over from one column to the other (or from one row to another row) and one should perhaps use more redundant symbols at the end of a column or row than in the middle.

FIG. 3 shows a matrix of codewords. The columns and rows comprise 3 data symbols, of which the columns have 2 redundant or check symbols, while the rows have only one check symbol. Such an approach may be selected when 2 consecutive errors can be expected to occur in at most one of 4 columns. This is equivalent to a symbol error ratio of 2*10⁻2. One can then use the check symbols q1, q2, q3, q4 and q5 to determine which of the rows has a single error. By recalculating the check symbols of the columns one can determine in which of the columns one or two errors have occurred (assuming for this example that only one of the 4 columns will have one or two errors). This determines which of the symbols is in error.

It should be understood that the number of check symbols and the size and dimension of the matrix depends on factors such as desired correction capability and expected symbol error ratio. For instance, if symbols are represented as true multi-valued signals one may want to focus on detecting and correcting single errors. However if n-valued symbols are represented by words of lower valued (such as binary) symbols, one has to address the fact that errors may occur in two adjacent symbols. It should be clear that within the constraints of expected errors one can identify the location of a symbol in error.

The technique of using parity or check bits in two dimensional or multi-dimensional matrices comprising data bits and check bits is known. For instance U.S. Pat. No. 3,831,144, issued on Aug. 20, 1974, inventor John En, entitled MULTI-LEVEL ERROR DETECTION CODE, discloses a two-dimensional matrix with horizontally and vertically determined check bits. The advantage of binary codes is that once the position of error is known one can determine the correct symbol, by flipping the symbol in error.

Independent Equations for Determining Check Symbols

Binary check symbols or parity bits are based on a limited relationship between the constituting bits. The relationship is commonly established by the binary XOR function. N-valued check symbols can have more varied reversible relationships as was explained in the earlier cited application Ser. No. 11/680,719. For instance one may have a word of 4 n-valued symbols [a b c d]. One may create a first n-valued check symbol $c1=(a \oplus b \oplus c \oplus d$. One may also create a second check symbol $c2=a \otimes b \otimes c \otimes d \otimes$. If only one of the symbols a, b, c or d is in error one can reconstruct the symbol in error both from c1 or c2 if these are not in error and both $\oplus$ and $\otimes$ are reversible operations. It should also be clear that two symbols in error can be reconstructed if the equations for c1 and c2 are independent and the operations are reversible. Calculation of c1 and c2 by $\oplus$ and $\otimes$ may be independent because the operations are totally different. The equations for c1 and c2 may be independent because the symbols a, b, c and d are processed with the same function but with for instance different n-valued inverters. For instance, $c2=a \oplus 2b \oplus 3c \oplus 2d$ in an n-valued code. The advantage of using n-valued coders with LFSRs either in Galois or in Fibonacci configuration is that each next generated check symbol has an independent equation from another check symbol in the code. That is a reason why Reed Solomon (RS) codes work as error correcting codes.

The advantage of using an LFSR is that one does not need to execute each expression or equation in full to generate a check symbol. The appropriate configuration of the LFSR takes care of generating the check symbols in accordance with independent expressions or equations. The drawback of the RS code is that the location of an error first has to be found by for instance solving an error correction polynomial. In order to be able to do that for each error there have to be 2 check symbols. By knowing where the errors occur, for instance by using a matrix with error symbols derived from columns and rows, one may be able to use just one check symbol per error.

In accordance with a further aspect of the present invention, one can calculate the correct value of a symbol in error of which the location is determined. In general, one can not correct two errors occurring in a 7 4-valued codeword as generated by the coder of FIG. 2. However, this error correction becomes possible when one knows which symbols are in error.

As an illustrative example assume 2 consecutive errors to occur in the code word [3 3 2 3 2]. The codeword is formed by the coder of FIG. 2 as [sig 4 p1 p2], wherein sig4 is a 4-valued data word sig4=[x2 x3×3]=[3 3 2] and [p1 p2]=[0 0]. The equations that are used to generate [p1 p2] are: p1={x1 sc2 (x2 sc1 x3)} and p2={p1 sc2 (x1 sc1 x2)}. The function sc2 is non-commutative, so care should be taken with the order of execution.

One needs to show that the data word can be recovered with any two consecutive errors. This means for received codewords [e1 e2 2 0 0], [3 e1 e2 0 0], [3 3 e1 e2 0] and [3 3 2 e1 e2]. The last codeword is of course the simplest to decode as only the check symbols [p1 p2] are in error, but not the data symbols. Consequently, the correct data word is of course [3 3 2].

Methods for Solving N-Valued Error Equations

There are actually several slightly different methods to solve the n-valued error equations. Which method one applies may depend on the complexity of the equations, the properties of the functions and which of the symbols are in error. The complexity and properties of functions is directly related to the value of n. For instance, if $n=2^p$ then one can use a function sc1 which is an addition over $GF(2^p)$ and multipliers over $GF(2^p)$. In that case sc1 is self-reversing, commutative and associative. This makes solving equations much easier. An illustrative example will be provided.

Under conditions where the position of an error symbol can be determined unambiguously, it is also possible to solve the equations unambiguously. If for some reason it is impossible or undesirable to solve equations in an algebraic fashion, one can solve the equations iteratively by using all possible values for the symbols in error. One will find only one combination of values that solves all equations correctly. Illustrative examples will be provided.

One method is to solve the equations in an algebraic fashion. In order to solve equations it is useful to review the rules for reversible, non-commutative and non-associative n-valued logic functions. Assume n-valued logic function 'sc' to be reversible, non-commutative and non-associative.

When (a sc b=c) then (b $sc^T$ a=c), with the truth table of $sc^T$ being the transposed of the truth table of sc.

When (a sc b=c) then (c scrc b=a), with the function 'scrc' being the reverse of 'sc' over constant columns.

When (a sc b=c) then (a scrr c=b), with the function 'scrr' being the reverse of 'sc' over constant rows.

When (b $sc^T$ a=c) then (b $sc^T$rr c=a), etc

For the coder of FIG. 2 the following two equations apply for generating p1 and p2: p1={x1 sc2 (x2 sc1 x3)} and p2={p1 sc2 (x1 sc1 x2)}.

Algebraic method. As a first example, assume that of [x1 x2x3 p1 p2] x3 and p1 are in error. Clearly a first simple step is to solve p2={p1 sc2 (x1 sc1 x2)} which has p1 as unknown. One can rewrite the equation as: {p2 sc2rc (x1 sc1 x2)}=p1. Herein the function sc2rc is the reverse of sc2 over constant columns. Its truth table is provided in the following table.

| sc2rc | 0 | 1 | 2 | 3 |
|---|---|---|---|---|
| 0 | 0 | 3 | 1 | 2 |
| 1 | 3 | 0 | 2 | 1 |
| 2 | 1 | 2 | 0 | 3 |
| 3 | 2 | 1 | 3 | 0 |

The assumption was that x3 and p1 were in error, so in the example the received codeword was [3 3x3 p1 0] using the earlier example. Filling in the values in the equation provides p1={0 sc2rc (3 sc1 3)} or p1=0 sc2rc 0=0.

From p1={x1 sc2 (x2 sc1 x3)} wherein now only x3 is an unknown one can derive: (x2 sc1 x3)={x1 sc2rr p1} wherein sc2rr is the reverse of sc2 over constant rows. Keeping in mind that sc1 is self reversing: x3=x2 sc1 (x1 sc2rr p1). The truth table of sc2rr is provided in the following table.

| sc2rr | 0 | 1 | 2 | 3 |
|---|---|---|---|---|
| 0 | 0 | 1 | 2 | 3 |
| 1 | 2 | 3 | 0 | 1 |
| 2 | 3 | 2 | 1 | 0 |
| 3 | 1 | 0 | 3 | 2 |

Thus, x3=x2 sc1 (x1 sc2rr p1) leads to: x3=3 sc1 (3 sc2rr 0) or x3=3 sc1=2.

One may apply the same approach when x2 and x3 are in error. In that case, one may apply p2={p1 sc2 (x1 sc1 x2)} to achieve (x1 sc1 x2)=p1 sc2rr p2 and thus achieve x2=x1 sc1 (p1 sc2rr p2). This will provide x2=3. Etc.

A more difficult situation occurs when x1 and x2 are determined to be in error. The equations will be fairly difficult to solve. Assume that x1=e1 and x2=e2. The equations will then be:

$p1=\{e1\ sc2(e2\ sc1\ x3)\}$ and $p2=\{p1\ sc2(e1\ sc1\ e2)\}$.

The value of p1 and p2 are correct. So one way to solve the equation in an iterative manner is to solve the equations:

$t1=\{e1\ sc2(e2\ sc1\ x3)\}$ and $t2=\{p1\ sc2(e1\ sc1\ e2)\}$ for all values of e1 and e2, and determine for which values of (e1,e2) the value (p1-t1) and (p2-t2) are both 0. Not surprisingly this will be the case for (e1,e2)=(3,3). This is a time consuming and not very elegant way to solve the problem, and should be a solution of last resort.

Fortunately for LFSRs defined within $GF(2^p)$, one can also use a different approach. Within $GF(2^p)$ the addition can be a self reversing, commutative and associative function. As is shown in FIG. 1, an LFSR in $GF(2^p)$ can be realized with functions which are a combination of adders with multipliers. One can reduce the functions by reduction of the truth tables according to the multipliers, as was shown in FIG. 2. This makes the execution of the coder quicker. In order to solve the equations one can revert back to associative adders with multipliers.

Figure 5:
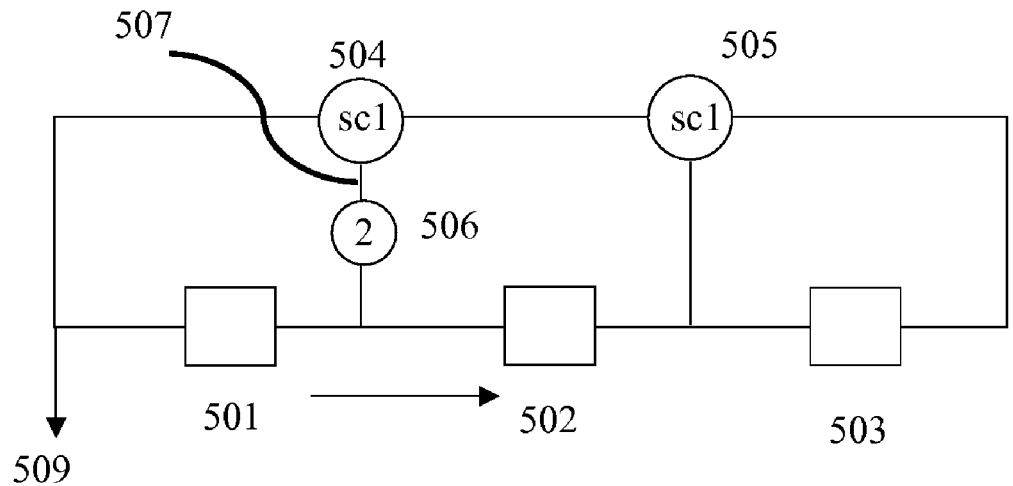
FIG. 5 is a diagram of an n-valued LFSR circuit for generating check symbols.

This is shown in FIG. 5 wherein the coder of FIG. 2 is equivalent to the coder as shown in FIG. 5. The shift register has elements 501, 502 and 503 which will be initiated with (in this illustrative example) the 4-valued symbols [x1 x2 x3]. The functions 504 and 505 are both the adder sc1 over $GF(2^p)$. One input of 504 has a 4-valued multiplier 506 representing x2, which is equivalent to a 4-valued inverter inv2=[0 2 3 1]

according to the truth table of the multiplier over GF($2^p$). The input of 507 of function 504 is here a symbol xt, which is an inverted value of the content of 501. This is, of course, different from FIG. 2 where the input to 204 is the value of 201.

The equations now become:

$$p1=\{xt1\ sc1\ (x2\ sc1\ x3)\}\ \text{and}\ p2=\{pt1\ sc1\ (x1\ sc1\ x2)\}.$$

Herein xt1=inv2(x1) and pt1=inv2(p1). Because sc1 is commutative, self-reversing and associative, one can change order of input, remove parentheses (or ignore order of execution) and move parts of the equation to the other side of the = without changing the function. Consequently: p1=xt1 sc1 x2 sc1 x3 and p2=pt1 sc1 x1 sc1 x2.

Assume again that x1 and x2 are in error. So the equations have to be solved for x1 and x2 and xt1. This leads to (xt1 sc1 x1)=(pt1 sc1 p1) sc1 (p2 sc1 x3). The parentheses are provided for the next step, but are not required when only using function sc1. It should be clear that (xt1 sc1 x1) is in fact (x1 sc2 x1), as a function sc1 with an inverter inv2 at the input can be reduced to sc2. One may also use (x1 sc1 xt1)=(x1 $sc2^T$ x1). Also (pt1 sc1 p1)=(p1 sc2 p1). Consequently: (x1 sc2 x1)=(p1 sc2 p1) sc1 (p2 sc1 x3). Or (x1 sc2 x1)=(0 sc2 0) sc1 (0 sc1 2), which is (x1 sc2 x1)=0 sc1 2=2. The solution (x1 sc2 x1) is the diagonal [0 3 1 2] of the truth table of sc2. The solution for (x1 sc2 x1)=2 belongs to x1=3, which is of course correct. One can now also determine x2 and calculate that x2=3.

The need for solving errors of 2 symbols in a word is because of the spill-over effect when one codes a symbol as for instance a binary word. One can never be sure that only an error in one symbol has occurred, so one should be prepared to solve the equations for two adjacent symbols in error. It is also possible that two errors have occurred in non adjacent symbols in a word. This assumes a different error behavior than for adjacent errors. Especially codewords generated by LFSRs (Galois and Fibonacci) that can be created by additions (with or without multipliers) over GF($2^p$), have easier to solve equations because of the associative properties of the addition function.

For instance, assume using the current 4-valued illustrative example with a coder as illustrated by FIG. 5, that x1 and p1 are found to be in error. Using again the equations p1={xt1 sc1 (x2 sc1 x3)} and p2={pt1 sc1 (x1 sc1 x2)}. Herein xt1=inv2(x1) and pt1=inv2(p1) and sc1 is a commutative, self-reversing and associative function. The way to approach this is to use arithmetic in GF($2^2$). The following rules apply using + and × in GF($2^2$).

Multiplication:

|     | 1 | 2 | 3 |
|-----|---|---|---|
| ×1  | 1 | 2 | 3 |
| ×2  | 2 | 3 | 1 |
| ×3  | 3 | 1 | 2 |

For instance, in GF($2^2$) under the earlier defined multiplication 2×2 x1=3x1, etc.

Addition

| +   | x1          | 2x1           | 3x1           |
|-----|-------------|---------------|---------------|
| x1  | x1 + x1 = 0 | x1 + 2x1 = 3x1 | x1 + 3x1 = 2x1 |
| 2x1 | 2x1 + x1 = 3x1 | 2x1 + 2x1 = 0 | 2x1 + 3x1 = x1 |
| 3x1 | 3x1 + x1 = 2x1 | 3x1 + 2x1 = x1 | 3x1 + 3x1 = 0 |

The distributive property applies to a×(b+c)=a×b+a×c.
Division is the inverse of multiplying.

| ÷ | 1 | 2 | 3 |
|---|---|---|---|
|   | 1 | 3 | 2 |

Accordingly, division by 1 is multiplying by 1; division by 2 is multiplying by 3; and division by 3 is multiplying by 2.

One can then write the equations as p1=2×x1+x2+x3 and p2=2×p1+x1+x2.

For instance, assume that x1 and x2 are known to be in error. Then x2=2×x1+x3+p1. Substitute in the p2 equation: p2=2×p1+x1+(2×x1+x3+p1) or 2×x1+x1=2×p1+p1+p2+x3, or 3×x1=3×p1+p2+x3. Dividing by 3 is multiplying by 2 so: x1=p1+2×p2+2×x3=0+2×0+2×2=3. Etc.

As another example, one may assume that not adjacent symbols x1 and p1 are in error. One must solve the equations then for x1. This leads to 2×x1=3×x2×2×x3+p2; or x1=2× x2+x3+3×p2=2×3+2+0=1+2=3. One achieves this result by applying the arithmetic rules in GF($2^2$) as stated before.

Galois field arithmetic may be preferred for solving the equations for in error symbols. However, these easy solutions may only be available for codewords defined in extension binary fields. As an illustrative example, a 5 symbol 5-valued code will be generated with 3 data symbols from a 5-valued LFSR as shown in FIG. 6

Figure 6:
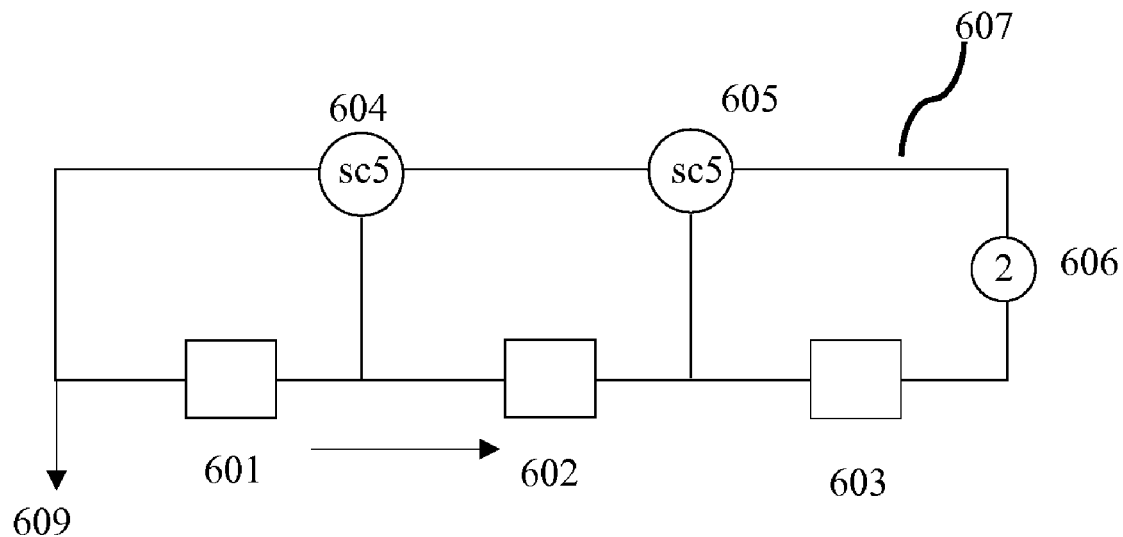
FIG. 6 is another diagram of an n-valued LFSR circuit for generating check symbols.

The coder in FIG. 6 is a 5-valued LFSR with shift register elements 601, 602 and 603. The taps have functions sc5 at 604 and 605. The end tap has a 5-valued multiplier factor 2, which is a 5-valued inverter [0 2 4 1 3]. The functions sc5 is addition modulo-5 of which its truth table is shown in the following table.

| sc5 | 0 | 1 | 2 | 3 | 4 |
|-----|---|---|---|---|---|
| 0   | 0 | 1 | 2 | 3 | 4 |
| 1   | 1 | 2 | 3 | 4 | 0 |
| 2   | 2 | 3 | 4 | 0 | 1 |
| 3   | 3 | 4 | 0 | 1 | 2 |
| 4   | 4 | 0 | 1 | 2 | 3 |

This coder will generate 5-valued codewords by providing the data symbols as initial shift register content and running the coder for two clock pulses. The check symbols will be generated on 609. The codewords thus generated have at most 2 symbols with another codeword in common. That means that 2 errors can be detected, and knowing the position of two errors, two errors can also be corrected. The first 25 codewords of this coder are provided in the following table.

| 0 | 0 | 0 | 0 | 0 |
|---|---|---|---|---|
| 0 | 0 | 1 | 2 | 2 |
| 0 | 0 | 2 | 4 | 4 |
| 0 | 0 | 3 | 1 | 1 |
| 0 | 0 | 4 | 3 | 3 |
| 0 | 1 | 0 | 1 | 3 |
| 0 | 1 | 1 | 3 | 0 |
| 0 | 1 | 2 | 0 | 2 |
| 0 | 1 | 3 | 2 | 4 |
| 0 | 1 | 4 | 4 | 1 |
| 0 | 2 | 0 | 2 | 1 |
| 0 | 2 | 1 | 4 | 3 |

-continued

| 0 | 2 | 2 | 1 | 0 |
|---|---|---|---|---|
| 0 | 2 | 3 | 3 | 2 |
| 0 | 2 | 4 | 0 | 4 |
| 0 | 3 | 0 | 3 | 4 |
| 0 | 3 | 1 | 0 | 1 |
| 0 | 3 | 2 | 2 | 3 |
| 0 | 3 | 3 | 4 | 0 |
| 0 | 3 | 4 | 1 | 2 |
| 0 | 4 | 0 | 4 | 2 |
| 0 | 4 | 1 | 1 | 4 |
| 0 | 4 | 2 | 3 | 1 |
| 0 | 4 | 3 | 0 | 3 |
| 0 | 4 | 4 | 2 | 0 |

The coder of FIG. 6 will be used for developing the equations to solve the errors. It should be clear that when a symbol x3 is in shift register element 603 a symbol value 2×x3 is provided to input 607 of function sc5 at 605. The 5-valued equations are then: p1={x1 sc5 (x2 sc5 2×x3)} and p2={p1 sc5 (x1 sc5 2×x2)} to generate codeword [x1 x2 x3 p1 p2]. Because sc5 is an addition (mod-5) one can write the equations as:

$p1=x1+x2+2 \times x3$ and $p2=p1+x1+2 \times x2$

Figures 7, 8:
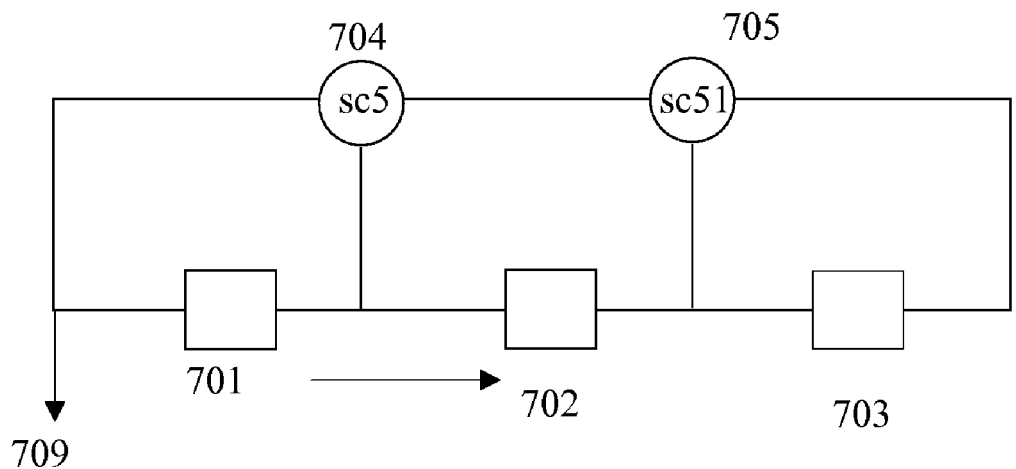
FIG. 7 is another diagram of an n-valued LFSR circuit for generating check symbols.
FIG. 8 is a matrix showing codewords with data symbols and check symbols.

One can reduce the coder of FIG. 6 to the coder of FIG. 7. The coder of FIG. 7 has 5-valued shift register elements 701, 702 and 703. The functions sc51 at 705 is the original function sc5 modified according to the multiplier and function sc5 at 704 remains sc5. The check symbols are generated on 707 and are identical to the ones generated on the coder of FIG. 6.

For the 5-valued arithmetic the following truth table need to be used for multiplication × and subtraction −, meaning (a-b) wherein 'a' is the row and 'b' is the column of the truth table.

| - | 0 | 1 | 2 | 3 | 4 |
|---|---|---|---|---|---|
| 0 | 0 | 4 | 3 | 2 | 1 |
| 1 | 1 | 0 | 4 | 3 | 2 |
| 2 | 2 | 1 | 0 | 4 | 3 |
| 3 | 3 | 2 | 1 | 0 | 4 |
| 4 | 4 | 3 | 2 | 1 | 0 |

| × | 0 | 1 | 2 | 3 | 4 |
|---|---|---|---|---|---|
| 0 | 0 | 0 | 0 | 0 | 0 |
| 1 | 0 | 1 | 2 | 3 | 4 |
| 2 | 0 | 2 | 4 | 1 | 3 |
| 3 | 0 | 3 | 1 | 4 | 2 |
| 4 | 0 | 4 | 3 | 2 | 1 |

One should further keep in mind that dividing by 2 is multiplying with 3, dividing by 3 is multiplying by 2 and dividing by 4 is multiplying by 4. Further more 3×3=4 and 4×4=1, etc.

Accordingly one will find for x1: p2=2x1+3x2+2 x3 or 3p2=x1+4x2+x3 or x1=(3p2−4x2)−x3. Assume from the table that [x1 x2x3 p1 p2] was [0 4 3 0 3] with x1 and p1 in error. The equation provides: x1=(3×3−4×4)−3=(4−1)−3=0. As another example assume from the codeword table that the codeword was [0 2 3 3 2] with x1 and p1 in error, so x1 has to be calculated from (x2, x3 and p2). The equation then provides x1=(3×2−4×2)−3=(1−3)−3=0. The tables show that 3×2=1 and 4×2=3 and 1−3=3 in modulo-5 arithmetic as defined by the tables.

The methods here presented as different aspects of the present invention also apply to detection and correction of more than 2 errors, such as three errors. In order to detect k errors in a codeword of n symbols, each codeword in a set of codewords must have at least k+1 different symbols in common positions from any other codeword in the set. Or each codeword may at most have (n−k−1) symbols in common positions. The best one can do in a 7 symbol codeword to detect 3 errors is having at most 3 symbols in common. Such a code would require 8-valued symbols and is generally known as an RS-code. It is possible to meet the error detection requirement in a lower valued symbol codeword. However, that would require a codeword with more symbols. It is then understood that other and different examples of detection 3 errors in a codeword can be provided according to different aspects of the present invention. As an illustrative example, an 8-valued 7 symbol codeword with 3 check symbols will be provided to demonstrate error correction when the position of errors is known.

One can identify the positions of the errors for instance by establishing a matrix as shown in FIG. 8. The data symbols occur sequentially as x1 ... x4, y1 ... y4, v1 ... v4, z1 ... z4. The symbols are broken up as 4 columns of 4 data symbols and horizontal check symbols t and tt are generated as well as vertical check symbols p, q, r and s. The assumption in the example is that errors will occur as at most 3 adjacent errors in a column. One skilled in the art may, of course, design 2 or 3 dimensional matrices for different (also non adjacent) errors and different symbol error ratios as well as different codeword sizes.

Assume that all symbols in the illustrative examples are 8-valued. By running 8-valued coders on the received data symbols one can check the newly generated check symbols against the received check symbols and determine which rows and columns are in error, thus determining the position of the errors. Based on the known error positions and the coder one can reconstruct the correct symbols in the error positions.

Figure 9:
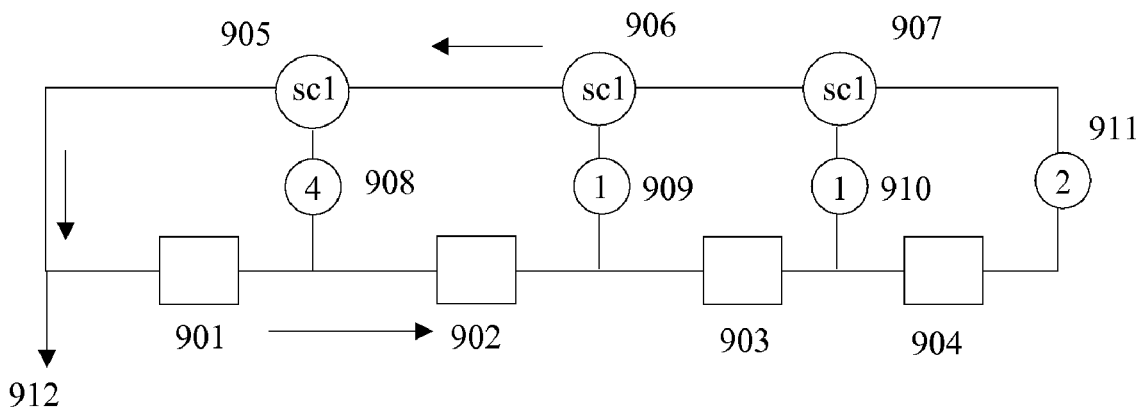
FIG. 9 is a diagram of an n-valued LFSR circuit for generating check symbols.

Assume that the 3 check symbols in the column of FIG. 8 are generated by the 8-valued Fibonacci coder of FIG. 9. This is an 8-valued LFSR with 4 shift register elements 901, 902, 903 and 904 with three identical 8-logic functions 905, 906 and 907 which is an addition sc1 over $GF(2^3)$. Also included are 4 multipliers 908, 909, 910 and 911 which are multipliers respectively of a factor 4, 1, 1 and 2 over $GF(2^3)$. At each clock cycle a check symbol in generated on output 912. According to earlier disclosed methods, the coder can be reduced in number of elements by reducing the addition according to the multipliers. One can also modify the Fibonacci configuration to a faster Galois configuration. All providing the same check symbols. However, for reconstructing the error symbols, especially applying GF(n) arithmetic, a Fibonacci configuration with multipliers may be preferred for error correction, though probably not for generating check symbols.

The truth tables of the addition sc1 and multiplier over $GF(2^3)$ are provided in the following truth tables.

| + | 0 | 1 | 2 | 3 | 4 | 5 | 6 | 7 |
|---|---|---|---|---|---|---|---|---|
| 0 | 0 | 1 | 2 | 3 | 4 | 5 | 6 | 7 |
| 1 | 1 | 0 | 4 | 7 | 2 | 6 | 5 | 3 |
| 2 | 2 | 4 | 0 | 5 | 1 | 3 | 7 | 6 |
| 3 | 3 | 7 | 5 | 0 | 6 | 2 | 4 | 1 |
| 4 | 4 | 2 | 1 | 6 | 0 | 7 | 3 | 5 |
| 5 | 5 | 6 | 3 | 2 | 7 | 0 | 1 | 4 |
| 6 | 6 | 5 | 7 | 4 | 3 | 1 | 0 | 2 |
| 7 | 7 | 3 | 6 | 1 | 5 | 4 | 2 | 0 |

| × | 0 | 1 | 2 | 3 | 4 | 5 | 6 | 7 |
|---|---|---|---|---|---|---|---|---|
| 0 | 0 | 0 | 0 | 0 | 0 | 0 | 0 | 0 |
| 1 | 0 | 1 | 2 | 3 | 4 | 5 | 6 | 7 |
| 2 | 0 | 2 | 3 | 4 | 5 | 6 | 7 | 1 |
| 3 | 0 | 3 | 4 | 5 | 6 | 7 | 1 | 2 |
| 4 | 0 | 4 | 5 | 6 | 7 | 1 | 2 | 3 |
| 5 | 0 | 5 | 6 | 7 | 1 | 2 | 3 | 4 |
| 6 | 0 | 6 | 7 | 1 | 2 | 3 | 4 | 5 |
| 7 | 0 | 7 | 1 | 2 | 3 | 4 | 5 | 6 |

The following table shows the division rule in GF($2^3$).

| ÷ | 1 | 2 | 3 | 4 | 5 | 6 | 7 |
|---|---|---|---|---|---|---|---|
| × | 1 | 7 | 6 | 5 | 4 | 3 | 2 |

Or division by 2 is multiplying by 7, division by 3 is multiplying by 6, etc.

The initial state of the shift register of the coder of FIG. 9 is [x1 x2 x3 x4]; in three clock cycles the coder will generate 3 check symbols [p1 p2 p3]. The equations for generating the check symbols are:

$$p1=4x1+x2+x3+2\times4;$$

$$p2=4p1+x1+x2+2\times3;$$

$$p3=4p2+p1+x1+2\times2.$$

One can solve these equations for any of the 3 symbols to be unknown. As one example assume [x1 x2 x3] to be in error. One can solve the linear equations by matrices or by substitution. Applying substitution one will find:

$$x3=7p1+4p2+5p3+x4;$$

$$x2=6p1+6p2+5p3+6\times3;$$

$$x1=p1+4p2+p3+2\times2;$$

and thus with [x4 p1 p2 p3] known one can solve the equations.

A partial set of 7 8-valued symbol codeword generated by the coder of FIG. 9 is shown in the following table.

| x1 | x2 | x3 | x4 | p1 | p2 | p3 |
|----|----|----|----|----|----|----|
| 0  | 4  | 7  | 2  | 2  | 3  | 4  |
| 1  | 3  | 7  | 1  | 0  | 3  | 7  |
| 2  | 5  | 6  | 4  | 1  | 2  | 2  |
| 3  | 5  | 4  | 2  | 5  | 7  | 1  |
| 4  | 3  | 7  | 1  | 5  | 6  | 3  |
| 5  | 4  | 6  | 6  | 0  | 0  | 0  |
| 6  | 3  | 4  | 0  | 7  | 1  | 2  |
| 7  | 7  | 2  | 4  | 7  | 0  | 1  |

One can easily check for the provided codewords using [x4 p1 p2 p3] in the equations to determine [x1 x2 x3].

One can provide the solution set for any of 3 or less symbols in a codeword being in error.

One may also determine solutions for independent sets of unknowns by applying Cramer's rule. As an example, the set of equations for the coder of FIG. 9 will be used. For application of Cramer's rule one should apply all additions and multiplications of in this example GF(8). When applying Cramer's rule using for other radix-n one should apply the appropriate arithmetic. In this example, one should apply addition and multiplication over GF($2^3$) of which the truth tables are provided above.

Assume that it is determined that x1, x2 and x4 are in error. The codeword in error is [x1 x2 x3 x4 p1 p2 p3]=[e1 e2 7 e4 5 6 3]. One should the create three equations with unknowns x1, x2 and x4 from the known equations as:

$$4x1+x2+2x4=p1+x3=$$

$$x1+x2+0=4p1+p2+2x3$$

$$x1+2x2+0=p1+4p2+p3$$

Cramer's rule then solves the above equations as:

$$x1 = \frac{\begin{vmatrix} d1 & 1 & 2 \\ d2 & 1 & 0 \\ d3 & 2 & 0 \end{vmatrix}}{D}$$

$$x2 = \frac{\begin{vmatrix} 4 & d1 & 2 \\ 1 & d2 & 0 \\ 1 & d3 & 0 \end{vmatrix}}{D}$$

$$x4 = \frac{\begin{vmatrix} 4 & 1 & d1 \\ 1 & 1 & d2 \\ 1 & 2 & d3 \end{vmatrix}}{D}$$

Herein $$D = \begin{vmatrix} 4 & 1 & 2 \\ 1 & 1 & 0 \\ 1 & 2 & 0 \end{vmatrix}$$

$$= 4 * \begin{vmatrix} 1 & 0 \\ 2 & 0 \end{vmatrix} + 1 * \begin{vmatrix} 1 & 0 \\ 1 & 0 \end{vmatrix} + 2 * \begin{vmatrix} 1 & 1 \\ 1 & 2 \end{vmatrix}$$

$$= 0 + 0 + 2 * (1+2) = 2 * 4$$

$$= 5,$$

as the rules of GF(8) are used.

Furthermore, $$\begin{pmatrix} d1 \\ d2 \\ d3 \end{pmatrix} = \begin{pmatrix} p1+x3 \\ 4p1+p2+2x3 \\ p1+4p2+p3 \end{pmatrix} = \begin{pmatrix} 4 \\ 6 \\ 0 \end{pmatrix}$$

Accordingly $$x1 = \frac{2}{5} = 4; \; x2 = \frac{7}{5} = 3 \text{ and } x4 = \frac{5}{5} = 1.$$

This is in accordance with the elements in the word as generated by FIG. 9.

One may also apply Cramer's rule to other n-valued codes, such as the 5-valued coder of FIG. 6. Herein, one should use the rules of modulo-5 addition and modulo-5 subtraction in the provided example, as well as the multiplication. Assuming that x2, p1 and p2 are correct and x1 and x3 are in error the equations become:

$$x1+2x3=p1-x2$$

$$x1\pm0=p2-p1-2x2.$$

The determinant $$D = \begin{vmatrix} 1 & 2 \\ 1 & 0 \end{vmatrix} = 1*0 - 2*1 = -2 = 3.$$

The solution vector is $$\begin{pmatrix} d1 \\ d2 \end{pmatrix} = \begin{pmatrix} p1 - x2 \\ p2 - p1 - 2x2 \end{pmatrix}.$$

Assume that the codeword [x1 x2 x3 p1 p2]=[e1 4 e3 2 0] was received. According to Cramer's rule:

$$x1 = \frac{\begin{vmatrix} d1 & 2 \\ d2 & 0 \end{vmatrix}}{D} = \frac{\begin{vmatrix} 3 & 2 \\ 0 & 0 \end{vmatrix}}{3} = 0, \text{ and}$$

$$x3 = \frac{\begin{vmatrix} 1 & d1 \\ 1 & d2 \end{vmatrix}}{D} = \frac{\begin{vmatrix} 1 & 3 \\ 1 & 0 \end{vmatrix}}{3} = \frac{1*0 - 3*1}{3} = \frac{-3}{3} = -1 = 4.$$

Accordingly, the correct codeword is [x1 x2 x3 p1 p2]=[0 4 4 2 0], which is the last codeword in the list of codewords that was provided. The example is fairly simple. However, it demonstrates that as long as the position of errors are known one may correct any adjacent or non-adjacent set of errors within the constraints of the number of independent equations.

For illustrative purposes errors are solved by using n-valued adders and multiplications, either modulo-n or over GF(n). An n-valued multiplication with a constant may be dealt with as an n-valued inverter. One may reduce combinations of n-valued inverters and an n-valued logic function to a function with a modified truth table as was shown by the inventor in U.S. patent application Ser. No. 10/935,960, filed on Sep. 8, 2004, which is incorporated herein by reference. An expression for a check symbol cs1=inv2(x1) sc5 inv3(x2) sc5 inv4(x3) may then be replaced by sc1=x1 sc51 x2 sc52, wherein sc51 and sc52 are the function sc5 modified in accordance with the inverters. This reduction may be applied to any expression having inverters and functions, including modulo-n adders and multipliers and adders and multipliers over GF(n). Accordingly, an n-valued expression created from adders and having at least one multiplier may be changed to an expression having at least one function not being an adder modulo-n or over GF(n). A function not being an adder over GF(n) or a modulo-n adder herein may be defined as an n-valued non-adder function.

In accordance with an aspect of the present invention, one may thus circumvent using an adder and multiplication by using an n-valued non-adder function in an expression to solve an error. Such an expression may be part of Cramer's rule.

Furthermore, one may over estimate the number of errors within the constraints. For instance, if only x1 was in error and x3 was not in error but the other conditions still apply then one still will reconstruct the correct value for x3. Even though x3 was not in error.

It is fairly simple to calculate the symbols in error 'on-the-fly', based on the errors. One can also already implement each set of solutions based on the maximum number of errors. Assuming 3 symbols in error even if only one is in error does not matter to the final error correction. One merely recalculates the symbols. The only limitation is that one of course can not solve more errors than independent equations. One can again see the clear advantage here of knowing where the errors are located. It cuts the number of required check symbols in half.

Figure 10:
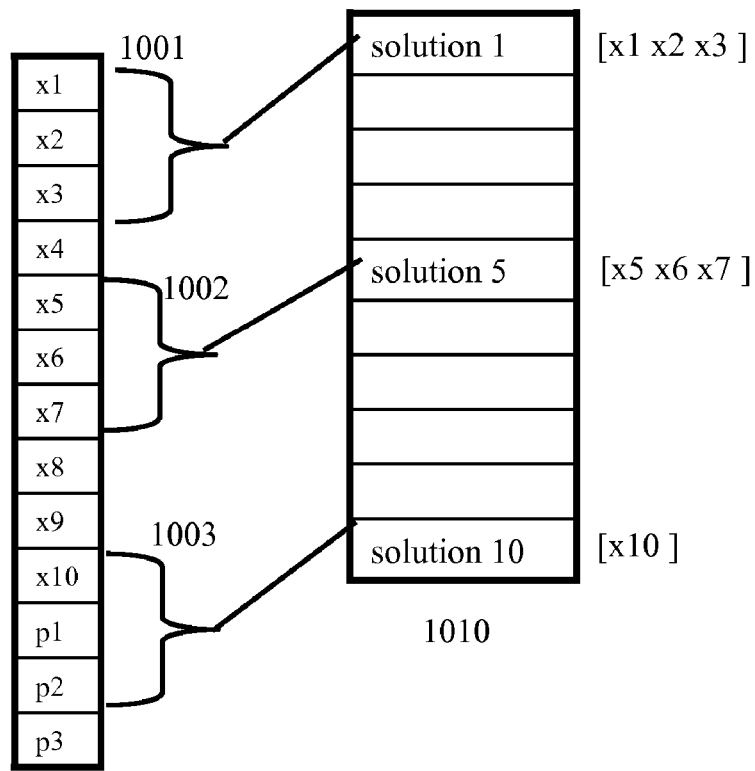
FIG. 10 is a diagram of an equation solver in accordance with one aspect of the present invention.

FIG. 10 provides a diagram for solving different equations depending on different errors. One can store the equations for specific combinations of errors. As an example, it is assumed that at most 3 consecutive symbols can be in error. For each error combination a solution set is determined a stored for instance as an executable program or is hard wired as a circuit. Assume a codeword having 10 data symbols and 3 check symbols and each codeword of the set has at most 9 symbols in common with another codeword. Assume that, for instance, through using also horizontal error check symbols one can determine where errors occur in a column 1000 in FIG. 10. Assume that errors occurred in position 1001 or in the first 3 symbols of the codeword. The solution for this situation is enabled as 'solution 1' in equation solver 1010. This equation solver may be part of a computer program or hard wired logic circuits. The solver is then provided with the known correct symbols [x4 x5 x6 x7 x8 x9 x10 p1 p2 p3] and then generates the correct [x1 x2 x3]. For another error situation 1002 the solver addresses a different 'solution 2' and generates [x5 x6 x7] and for error situation 1003 the solver addresses yet another 'solution 3' which may generate just x10 or also [p1 p2] if those symbols are used in a later stage.

Figure 11:
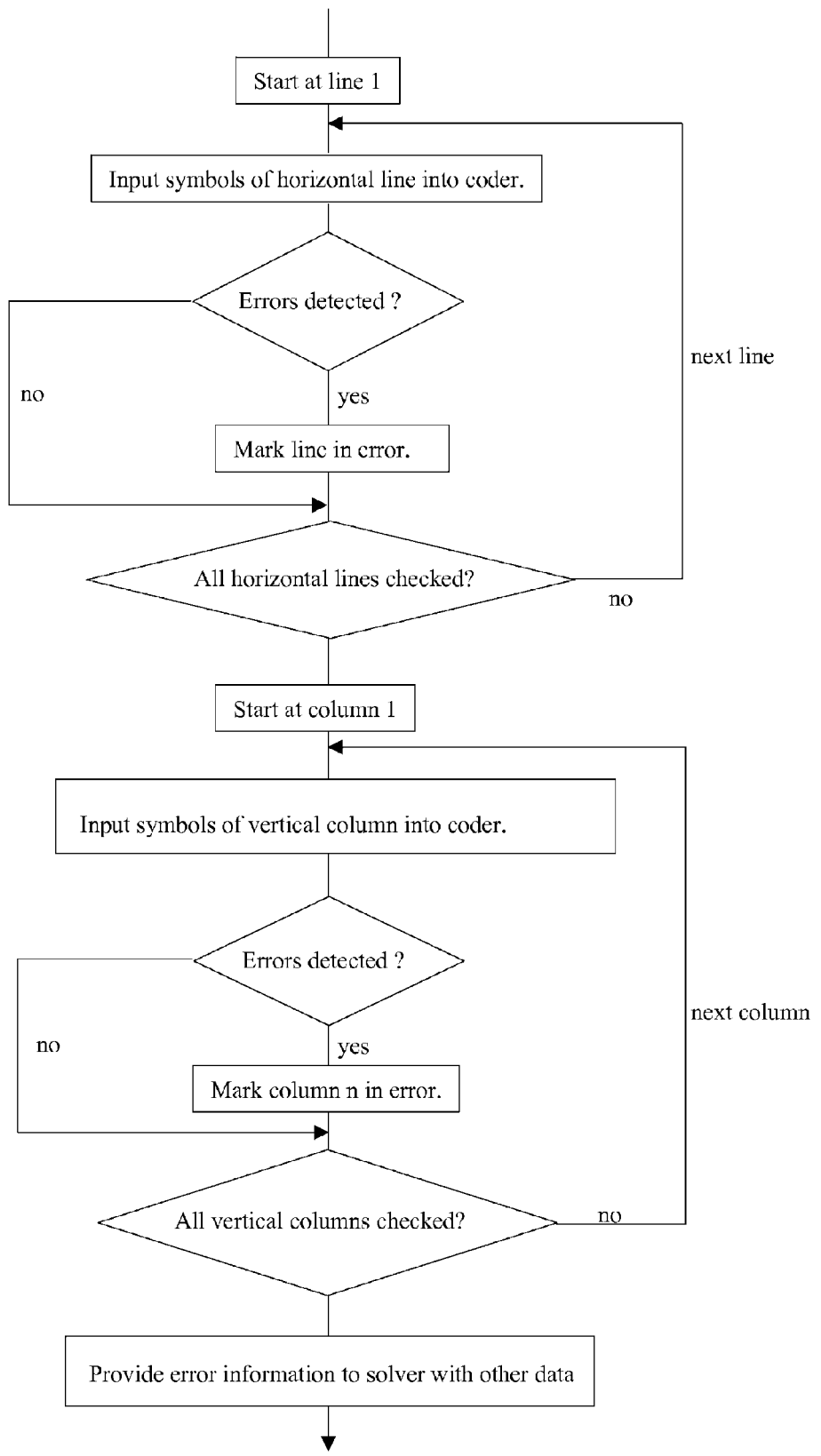
FIG. 11 is a flow diagram for determining check symbols in accordance with a further aspect of the present invention.

FIG. 11 shows a possible flow diagram of determining the errors in a two dimensional symbol matrix with lines and columns. This is for illustrative purposes only. The symbols can be arranges in multi-dimensional matrices (3 dimensional and higher) and the arrangement does not need to be of a square or rectangular shape. In the flow diagram first all horizontal lines are checked against the received check symbols by running a coder on the incoming data symbols. If newly calculated check symbols and received check symbols are different the line has at least one symbol in error. After completing the lines the columns will be analyzed. It should be clear that the checking in the diagram can be performed in many different ways. One can first check the columns and then the lines. One can stop checking if a certain number of lines or columns in error have been detected. One may also check different dimensions in parallel, and many other approaches can be applied and are fully contemplated. The error positions, once established, will be provided to the 'solver' of which one illustrative example has been provided in FIG. 10.

Again referring to FIG. 3, one may analyze the method that is provided here as an aspect of the present invention as follows. At least one word of n-valued symbols having at least one check symbol may be designated as a positional codeword. For instance, as an example one may consider the rows in FIG. 3 as the positional codewords. One may consider the columns of the matrix as the equational codewords, which provide the plurality of check symbols and equations from which known errors can be solved. The combination of check symbols in the positional and equational codewords provides the position of an error in a codeword. While the matrix of FIG. 3 is two-dimensional, more dimensional matrices of codewords can also be used. Once the positions of the error are located, one can then assign the symbol that is in error as an unknown in the sets of equations derived from the equational codewords. With known or assumed patterns of errors one may provide additional input to solving the equations.

Checking the Check Symbols

An aspect of the present invention is to make sure that no confusion can arise about the status of a check symbol. If a check symbol is part of a set of p independent equations then knowing that one of at most p symbols is in error and knowing which of at most p symbols are in error, which may include check symbols, is sufficient to correct errors. However, if error free check symbols are required to locate an error one may have to take additional measures to make sure that errors in check symbols can be located and corrected. One may take additional measures to solve errors in check symbols.

Figures 15, 16:
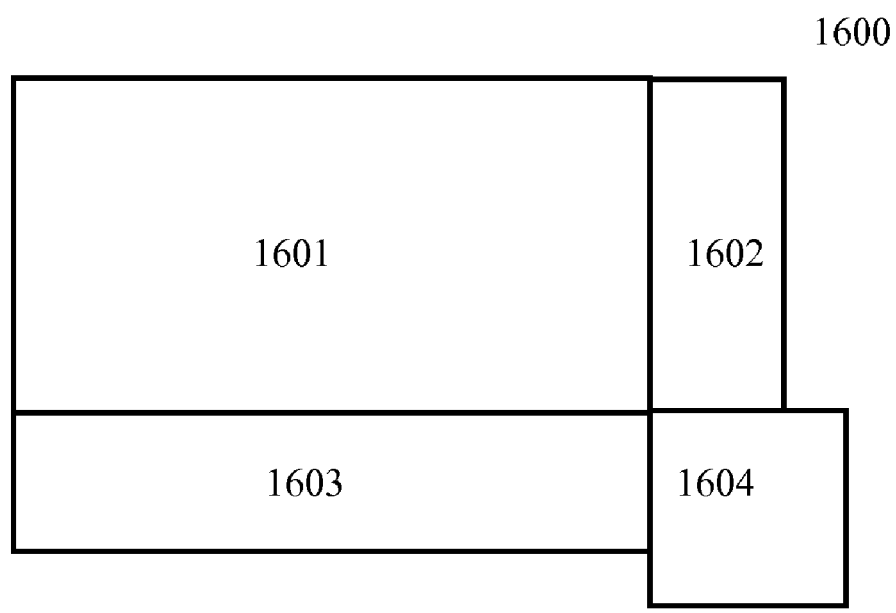
FIG. 15 illustrates detecting symbol errors in a coding matrix in accordance with an aspect of the present invention.
FIG. 16 illustrates coding a plurality of n-valued symbols according to a matrix in accordance with an aspect of the present invention.

FIG. 16 shows in diagram a 2 dimensional matrix or array 1600 of n-valued symbols. It should be understood that the aspects here explained can be applied to any k-dimensional array of symbols. For illustrative purposes, the example is limited to the 2-dimensional case. The rectangle 1601 represents rows and columns of n-valued symbols. Rectangle 1602 contains the check symbols over a row. It may be called a field of row check symbols. As disclosed before, each row may have more than 1 check symbol assigned to it calculated from data symbols in a row. Each check symbol may be calculated in different ways. For instance, two different check symbols calculated over a row may be calculated using all symbols in a row, but using different equations which may be part of a linear independent set.

A row of a matrix may have p n-valued data symbols. A check symbol over a row may also be calculated from a number m with m<p of data symbols. One may herein use similar or different expressions to calculate check symbols.

FIG. 16 rectangle 1603 is a field of check symbols calculated from a column of the matrix of n-valued data symbols represented by 1601. One or more check symbols may be calculated over each column. One may use all data symbols in a column to calculate a column check symbol. One may also not use all data symbols in a column. Furthermore, one may use different n-valued expressions to calculate a check symbol in a column or a row. One may also use the same expression.

Furthermore, one may include a previously calculated check symbol in calculating a next check symbol over a row or a column.

In accordance with a further aspect of the present invention, a field 1604 may be created which creates check symbols from check symbols. Field 1604 is drawn to be broader than field 1602 and deeper than field 1603. The reason is to illustrate that if a column of data symbols generates k check symbols and a row generates r check symbols then if the same check symbol generating rules are applied also (2×k×r) check symbols of check symbols will be generated. One may also generate more check symbols. For instance one may use a Reed Solomon coding scheme to correct up to e errors in any row or column in a matrix. For instance, with a relatively high coding rate with a high ratio of data symbols to check symbols, it may be worthwhile to assure error free check symbols, as the overhead for error correcting check symbols would be much lower than full RS error correction for each and every word of data symbols.

Low Density Parity Check Symbol (LDPCS) Code

One may calculate w n-valued check symbols from different data-symbols in a sequence of p n-valued data symbols. One should make sure that a data symbol is then included in at least two different check symbols. By limiting the number of check symbols to obtain a code rate which is about the same or better than the code rate of a Reed Solomon code one can thus create an n-valued Low Density Check Symbol (LDCS) code. Such a code is not unlike the known binary Low Density Parity Check (LDPC) code. However, in a binary LDPC code a parity check symbol can only be determined in a limited number of ways, usually by applying the binary XOR function. The variation of expressions for determining an n-valued check symbol is much greater than in the binary case. It thus enables to create a much greater variety of low density codes.

In general, a LDPC code determines parity bits over parts of a sequence of bits. By arranging information symbols in a 2-dimensional or higher dimensional matrix and by determining one or more check symbols over a dimension one creates what is generally known as a product code.

Figure 17:
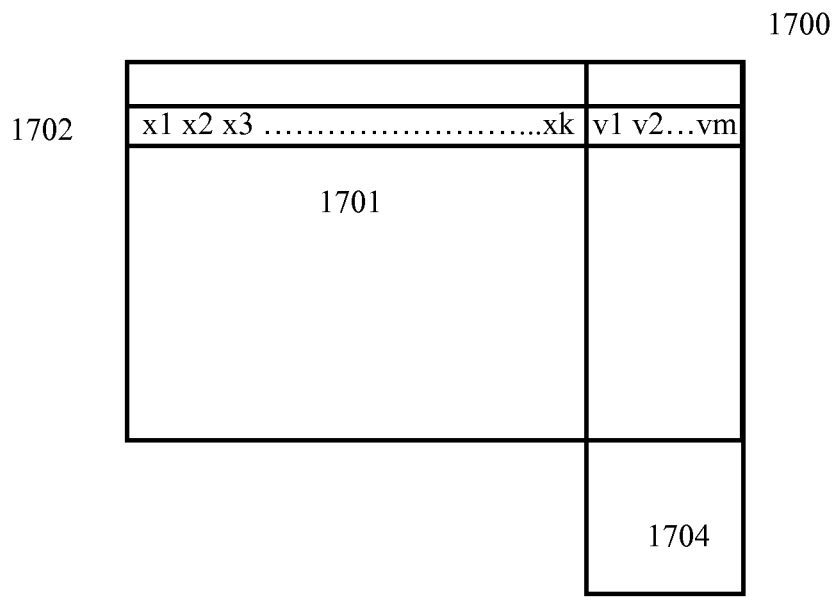
FIG. 17 illustrates coding a plurality of n-valued symbols in accordance with another aspect of the present invention.

In a simple form an n-valued LDCS code 1700 may look as in FIG. 17. A sequence of n-valued data symbols [x1 ... xk] may be arranged in a matrix 1701, wherein each line 1702 has a series of symbols containing one or more of the n-valued data symbols. Each line also contains at least one check symbol v. One may generate one than one check symbol shown as [x1 ... vm]. In general only one check symbol is generated per line. As with LDPC in a line not all data symbols are used but just a limited number. What is different between LDPC and LDCS codes as defined here a line formed by a set of data symbols and one or more check symbols form an expression which is part of a set of linear independent equations. Accordingly, one could write the formation of the check symbol in line 1702 as: $a1*x1+a2*x2+a3*x3+ \ldots ak*xk=v1$. Herein a coefficient ak may be 0.

One may calculate other check symbols in the line using different coefficients. A similar calculation for check symbols in p lines of the same data symbols, each calculation being performed in accordance with an equation from the set of p linear independent equations can then be performed. Furthermore, one may add one or more check symbols per series of check symbols in 1704 to make sure that check symbols are error free.

This means that when it is known which symbol is in error (including the check symbol) one can solve p errors.

For instance, it may be assumed that errors occur in a burst and that at most p consecutive errors in symbols can occur. One may then, as was shown earlier, solve the errors for instance by applying Cramer's rule adapted to the n-valued logic functions that are used in an expression. The number of consecutive errors that can be corrected then depends on the number of linear independent equations. The number of linear independent equations depends of course on n in n-valued. One may use then an additionally generated check symbol per line, using a different equation or expression to check if a calculated to be correct data symbol is indeed correct.

In accordance with an aspect of the present invention, one can thus create an error detecting and/or error correcting code from a plurality of n-valued data symbols by creating a plurality of n-valued check symbols, an n-valued check symbol being generated from an n-valued expression wherein the value of at least one of the plurality of n-valued data symbols is a variable in the expression. In accordance with a further aspect of the present invention, at least two of the plurality of n-valued data symbols are variables in an expression to generate a check symbols. In accordance with yet a further aspect of the present invention, check symbols are calculated from the check symbols. In yet a further aspect of the present invention an expression to calculate a check symbol is an equation in a plurality of linear independent equations. In yet a further aspect of the present invention, an assumption may be made on which symbols are in error. Based on the assumption one may then calculate the correct value of the symbols assumed to be in error. One may check the correctness of assumption by recalculating check symbols. Such recalculated check symbols may be different from the ones which were used for resolving symbols assumed to be in error. Accordingly, one may create in accordance with an aspect of the present invention a low density check symbol code which allows for error detection and/or error correction. Creating and using such a code applies to n>2.

As an illustrative example one may apply the coder of FIG. 9. The initial state of the shift register of the 8-valued coder of FIG. 9 is [x1 x2x4]; in three clock cycles the coder will generate 3 check symbols [p1 p2 p3]. The equations for generating the check symbols are:

$p1=4x1+x2+x3+2x4;$ $p2=4p1+x1+x2+2x3;$ $p3=4p2+p1+x1\pm 2x2.$

One may make different assumptions about errors in data symbols or check symbols. Up to three symbols may be corrected. As an illustrative example assume that 2 consecutive errors can occur and that the sequence of symbols is transmitted as [x1 x2 x3 x4 p1 p2 p3]. One may then solve 2 equations with the assumed errors as unknowns and apply the third equation to check correctness of solutions. Assumed symbols in error can be (x1,x2); (x2,x3); (x3,x4); (x4,p1); (p1,p2); and (p2,p3). It should be easy to solve any of the assumed errors and check if the assumption is correct.

In general, one may use LDCS codes for larger sequences of symbols. In those cases hard coding based on assumptions will probably not practical and an iterative approach should be used.

Shifting the Matrix

If there are a limited number of overlapping errors in a block determined by a matrix, then determining the occurrence and position of an error is simple and an error corrected symbol may be calculated very rapidly. One may adapt the size of a block or matrix to an expected symbol error ratio. When the block is too small there may be no advantage over other error correcting methods. The here provided methods may be advantageous for instance when burst errors may occur. Especially in systems with very high data throughput and requirement for limited latency the methods may be advantageous. In general, known methods use syndrome calculations or are iterative, using maximum likelihood methods. Working close to the Shannon limit these methods may process large blocks of data contributing to decoding latency.

Error correcting blocks having potentially large bursts of errors that can be easily detected and error corrected are another aspect of the present invention. Detection of two errors requires two check symbols. The problem of detecting multiple errors in a single matrix having data symbols and check symbols is that two errors can cancel each other if the check symbol is not determined by an expression that can detect 2 errors.

There are several ways to detect multiple errors in a word of n-valued symbols. As an illustrative example, a series of n-valued symbols is organized in a matrix and check symbols are calculated along columns and rows. One may make the matrix multi-dimensional. To keep the example simple a 2 dimensional matrix is used, though such a limitation is not required. One can determine check symbols along columns and rows for instance. The coding matrix is shown in the following table with check symbols p and q.

| p11 | p21 | p31 | p41 | p51 | p61 | p71 | p81 |     |
|-----|-----|-----|-----|-----|-----|-----|-----|-----|
|     |     |     |     |     |     |     |     | q11 |
| Xe1 | X1  |     |     |     |     |     |     | q21 |
|     |     |     |     |     |     |     |     | q31 |
|     |     |     |     |     |     |     |     | q41 |
| X2  | Xe2 |     |     |     |     |     |     | q51 |
|     |     |     |     |     |     |     |     | q61 |
|     |     |     |     |     |     |     |     | q71 |
|     |     |     |     |     |     |     |     | q81 |

It should be clear that detecting a single error and correcting such an error is easy if a check symbol is created from a reversible expression. Even multiple errors can be detected and corrected. However, this requires that (when using a single check symbol per word in a column or a row) two errors that cancel each other out do not occur in the same row or column. In the illustrative example in the above table check symbols p11, p21, q21 and q51 are found to be in error. One has to solve each error from one check symbol recalculate the second check symbol to make sure that one has identified the appropriate error. If indeed no error overlaps then one can solve the check symbol equations for (X1,X2) and (Xe1, Xe2). Only corrected (Xe1,Xe2) will provide both the correct column and row check symbols.

One way to solve overlapping errors is to provide additional check symbols, such as using a multi-valued CRC code. An example is provided in the following table.

| p11 | p21 | p31 | p41 | p51 | p61 | p71 | p81 |     |     |
|-----|-----|-----|-----|-----|-----|-----|-----|-----|-----|
|     |     |     |     |     |     |     |     | q11 | q12 |
| Xe1 | X1  |     |     |     |     |     |     | q21 | q22 |
|     |     |     |     |     |     |     |     | q31 | q32 |
|     |     |     |     |     |     |     |     | q41 | q42 |
| X2  | Xe2 |     |     |     |     |     |     | q51 | q52 |
|     |     |     |     |     |     |     |     | q61 | q62 |
|     |     |     |     |     |     |     |     | q71 | q72 |
|     |     |     |     |     |     |     |     | q81 | q82 |

Both (Xe1,X1) and (X2,Xe2) can be calculated with the above methods. If one assumes a total number of adjacent errors being 2 than one can also correct the errors if they overlap by 1 using the above methods. However, by using more check symbols the advantage over for instance Reed Solomon codes may disappear or become less pronounced.

If one uses the correct expressions two errors in a row or a column may always be detected if 2 check symbols are provided over a row or a column. If not the correct expressions for calculating check symbols are used or for instance only one check symbol is used over a column or row then errors may cancel each other out.

One simple way to increase the benefit of additional check symbols is by calculating the check symbols over a same number but differently arranged data symbols. This helps in 'unhiding' hidden errors. Such a coding method may not be as efficient in number of check symbols as other maximum-likelihood decoding parity check methods. However decoding methods can be very fast.

In accordance with an aspect of the present invention, a series of (p×q) n-valued data symbols are arranged in such a way that at least p+q check symbols are generated. A check symbol belongs then to a word of p data symbols or to a word of q data symbols. In an embodiment of the present invention the same data symbols will be re-arranged and again p+q check symbols will be generated, wherein at least either the words of p data symbols or the words of q data symbols do not have the same data symbols in the word. This can be illustrated in the following table.

| p1  | p2  | p3  | p4  | p5  |    | s1  | s2  | s3  | s4  | s5  |    |
|-----|-----|-----|-----|-----|----|-----|-----|-----|-----|-----|----|
| a11 | a12 | a13 | a14 | a15 | q1 | a11 | a12 | a13 | a14 | a15 | q1 |
| b21 | b22 | b23 | b24 | b25 | q2 | b22 | b23 | b24 | b25 | b12 | q2 |
| c31 | c32 | c33 | c34 | c35 | q3 | c33 | c34 | c35 | c31 | c32 | q3 |
| d41 | d42 | d43 | d44 | f45 | q4 | d44 | d45 | d41 | d42 | d43 | q4 |
| f51 | f52 | f53 | f54 | f55 | q5 | f55 | f51 | f52 | f53 | f54 | q5 |

For calculating the check symbol of a column a row is shifted one position to the left compared to its position to the row above it. This means that the check symbols over a column may be different while the check symbols over a row remain the same. Such a shift may be considered adding another dimension to a check symbol matrix.

The advantage of the methods provided herein as an aspect of the present invention is that one may reduce the overall number of check symbols and faster calculation of the correct symbols based on an assumption of error behavior.

One may design different shifts over columns and rows. For instance, in an illustrative example, one may use the following transformation of a matrix to create different sets of check symbols.

| p1 | p2 | p3 | p4 | p5 |    | s1 | s2 | s3 | s4 | s5 |    |
|----|----|----|----|----|----|----|----|----|----|----|----|
| 11 | 12 | 13 | 14 | 15 | q1 | 11 | 53 | 45 | 32 | 24 | r1 |
| 21 | 22 | 23 | 24 | 25 | q2 | 25 | 12 | 54 | 41 | 33 | r2 |
| 31 | 32 | 33 | 34 | 35 | q3 | 34 | 21 | 13 | 55 | 42 | r3 |
| 41 | 42 | 43 | 44 | 45 | q4 | 43 | 35 | 22 | 14 | 51 | r4 |
| 51 | 52 | 53 | 54 | 55 | q5 | 52 | 44 | 31 | 23 | 15 | r5 |

The transformation rule is to shift every element in a row and each element in a column compared to a previous transformation, whereby the first element 11 is not transformed. One can then determine a check symbol over each row and column. No two data symbols will then be in the same row or column after and before transformation. One may determine the check symbols in intermediate steps; for instance first a row transformation and then a column transformation. For determining check symbols one may use simple expressions. For instance one may use an addition, for instance modulo-n or over GF(n) to determine a check symbol. In n-valued check symbols one may also apply more complex expressions like: k1*x1 sc1 k2*x2 . . . scm kp*xp=r wherein x1 . . . xp are n-valued data symbols, k1 . . . kp are n-valued coefficients and sc1 . . . scm are n-valued reversible functions.

As an illustrative example the following matrix of 25 4-valued data symbols is assumed.

| 0 | 1 | 2 | 3 | 4 |
|---|---|---|---|---|
| 1 | 0 | 1 | 0 | 3 |
| 3 | 3 | 1 | 1 | 0 |
| 0 | 1 | 3 | 2 | 1 |
| 1 | 3 | 2 | 3 | 0 |

The following matrices are received in accordance with the previously shown transformation and including 4-valued check symbols over columns and rows before and after transformation by using the addition over GF(4) over all symbols in a row or a column. Transmission errors are included in the matrices.

| 0 | 1 | 2 | 3 | 2 | 2 |   | 0 | 2 | 1 | 3 | 0 | 0 |
|---|---|---|---|---|---|---|---|---|---|---|---|---|
| 0 | 1 | 1 | 0 | 3 | 3 |   | 3 | 1 | 3 | 0 | 1 | 0 |
| 1 | 3 | 1 | 1 | 0 | 0 |   | 1 | 0 | 2 | 0 | 1 | 3 |
| 0 | 1 | 3 | 2 | 1 | 1 |   | 3 | 0 | 1 | 3 | 1 | 1 |
| 1 | 3 | 2 | 3 | 0 | 3 |   | 3 | 2 | 1 | 1 | 2 | 1 |
| 3 | 0 | 3 | 3 | 0 |   |   | 2 | 0 | 3 | 1 | 3 |   |

The bottom row shows the check symbols over columns. The most right column in a matrix shows the check symbols over the rows. A check symbol over the column and row of check symbols may also be included. This was left out in this example.

One then may re-calculate the check symbols which will provide the following results.

| 0 | 1 | 2 | 3 | 2 | 2 |   | 0 | 2 | 1 | 3 | 0 | 0 |
|---|---|---|---|---|---|---|---|---|---|---|---|---|
| 0 | 1 | 1 | 0 | 3 | 3 |   | 3 | 1 | 3 | 0 | 1 | 0 |
| 1 | 3 | 1 | 1 | 0 | 2 |   | 1 | 0 | 2 | 0 | 1 | 2 |
| 0 | 1 | 3 | 2 | 1 | 1 |   | 3 | 0 | 1 | 3 | 1 | 0 |
| 1 | 3 | 2 | 3 | 0 | 3 |   | 3 | 2 | 1 | 1 | 2 | 3 |
| 3 | 0 | 3 | 3 | 0 |   |   | 2 | 1 | 0 | 1 | 3 |   |

In order to highlight the differences between the received and recalculated matrices one may take for instance the difference between the two. This will provide the following.

| 0 | 0  | 0 | 0 | 0 | 0  |   | 0 | 0  | 0 | 0 | 0  |
|---|----|---|---|---|----|---|---|----|---|---|----|
| 0 | 0  | 0 | 0 | 0 | 0  |   | 0 | 0  | 0 | 0 | 0  |
| 0 | 0  | 0 | 0 | 0 | -2 |   | 0 | ▓  | ▓ | 0 | 1  |
| 0 | 0  | 0 | 0 | 0 | 0  |   | 0 | ▓  | ▓ | 0 | 1  |
| 0 | 0  | 0 | 0 | 0 | 0  |   | 0 | ▓  | ▓ | 0 | -2 |
| 3 | -1 | 0 | 0 | 0 |    |   | 0 | -1 | 3 | 0 | 0  |

If one would depend only on the first matrix one may conclude wrongly that only the first two elements of the third row are in error. The shaded area in the second matrix shows that other potential errors may have occurred. By mapping the positions of potentially the most identified errors, which occur in the second matrix into the matrix with fewest identified errors one can find the actual errors. This can be done by using the reverse transformation. One then finds

| 0 | 0 | 0 | 0 | 0 | 0 |
|---|---|---|---|---|---|
| e1 | e2 | 0 | 0 | 0 | 0 |
| e3 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |

One can then solve e2 from the relevant column check symbol; one can solve e3 from the relevant row check symbol and one can solve e1 from either column check symbol and e3 or from row symbol and e2.

One can thus solve a plurality of sometimes fairly complex error patterns. The method here provided can be further extended by generating additional check symbols by using additional matrix transformations. Furthermore, one may use iterative methods to solve errors that are potentially identified but cannot be resolved in a deterministic way.

One may create one or more matrix transformations so that matrices have no or just a very limited number of elements in a same position. Furthermore, one may create a matrix of n-valued data symbols in such a way that elements such as symbols will not appear in the same row and/or the same columns and/or not in a common row and/or in a common column with the same elements as in another matrix. This last aspect prevents double or multiple errors appearing in shared columns or rows. This allows for unhiding hidden double or multiple errors.

One can thus first calculate check symbols according to a matrix before transmission of symbols. Then one transmits all symbols, including the check symbol. The matrix is reconstructed from received symbols which may contain errors. The check symbols are recalculated from received symbols. One can then compare received and recalculated check symbols. By using additional matrices for generating check symbols one can uncover hidden errors from double or multiple symbols in error. One does this by using from a matrix all possible errors and mapping error positions into another matrix. The other matrix may show an error pattern. One may use different matrices. The real errors are those that will not create a conflict in any of the matrices.

Accordingly, one can articulate the coding and decoding as associating n-valued data symbols or the positions of n-valued data symbols with at least a first and a second 2-dimensional matrix. Herein a three or higher dimensional matrix is assumed to also be included in a first and a second matrix. Check symbols will be generated along the data symbols in a row and in a column of a matrix. This will be called: determining check symbols along the dimensions of a matrix. Associating n-valued data symbols with a matrix does not mean associating symbols with a Generating Matrix G or a Parity Matrix H which is known. Associating with a matrix in this context means associating a symbol with a position in a matrix. The matrices may have identical dimensions, they may also have different dimensions. A position in one matrix may be related to a position in a second matrix. By changing the dimensions of a matrix one may store the same number of data symbols but generate a different number of check symbols. For instance, a first matrix of p×p symbols may generate (p+p)=2p check symbols, if one generates a check symbol per row and per column. Changing the dimensions to ½ p by 2p will generate 2½ p check symbols.

The advantage of this method is that more errors can be detected in a single word than with other methods by using on average fewer check symbols per word. For instance, for a word of 20 symbols to detect 5 errors would require 10 additional symbols in for instance a Reed Solomon code. A 20 by 20 matrix in RS would then require 200 check symbols. Even though the errors will occur in one of 20 words. In the present method 2 check symbols per column and row may be required adding 80 check symbols. One may want to add a field for checking the check symbols. So if a certain error rate and a distribution of errors can reasonably be established the error detection/correction method provided herein may be faster and more efficient.

It should be clear that the here provided methods and apparatus and systems also apply to binary coders and decoders. The solver equations for the binary case are easy to determine as the multipliers are limited to 0 and 1, and the applied function is usually the XOR function, which is commutative, associative and self reversing. The binary EQUAL function can also be used.

For illustrative purposes, the expected symbol errors were limited to one vertical codeword per set of codewords. This can easily be expanded to more vertical codewords with errors. However, it requires then the horizontal codewords to be expanded with additional check symbols. Furthermore it may initially not be clear which of the symbols are in error. This is illustrated in FIG. 15. FIG. 15 is a modified version of the coding matrix of FIG. 8. An extra column with check symbols cc1, cc2, cc3, c1, c2, c3 and c4 has been added. This allows detection of 2 errors in any horizontal line codeword. FIG. 15 shows that errors have been detected in shaded columns under p1 and r1 and in shaded horizontal lines with t1 and t4. Accordingly, (assuming that all errors are adjacent and only one or one set of adjacent errors occur in a column) column under p1 has either x1 or x4 in error. If column under p1 has x1 in error then the column under r1 has v1 in error. If column under p1 has x4 in error then the column under r1 has v1 in error. As the solver has all relevant equations is it easy to determine both (x1,v4) and (x4,v1). Only one of those solutions will generate the correct check symbols. It should be clear that different error detecting strategies can be developed.

In FIGS. 4 and 8 examples are provided how codewords can be arranged for error detection and error correction. It should be clear that this is usually not the way that codewords are actually transmitted. In general, symbols are transmitted sequentially, one behind each other, to form a sequence of symbols. Check symbols have to be inserted into the sequence in a pre-determined way at the transmitting side. At a receiving end the codewords with respective check symbols have to be extracted and have to be matched with their appropriate codeword symbols. Accordingly, a series of codewords may have to be organized in a frame and transmitted as a sequence and deconstructed in its constituting codewords at the receiving side, using the frame information. Synchronization words may be used to determine beginning and ending of a frame. Expected symbol error ratios may be applied to determine where to insert check symbols in a frame. Additional check symbols may be provided to find critical errors in check symbols.

The methods and systems here provided can save substantial check symbol redundancy. For instance, assume a matrix of 100 data symbols arranged in 10 columns and 10 horizontal lines or rows. Assume that at most 3 consecutive symbols in 100 data symbols have to be error corrected. One can do that by assigning 3 check symbols to the columns and assigning 1 check symbol to a horizontal line. This means a overhead of 3×10+13=43 if the vertical column of check symbols requires no check. This differs with having 10×6=60 check symbols if one wants each vertical column to be error corrected for 3 errors by an RS code. Additionally, the error correcting solver as an aspect of the present invention is simple and fast.

As an aspect of the present invention, a distinction is made between detecting symbols in error and correcting errors. The known art of error correction also makes a distinction between error detection, erasures and error correction. In many cases error detection in the known art often means detecting that a specific codeword is in error. That still leaves uncertainty about the location of the error or in other words which of the symbols in a word is in error. Accordingly, in this invention, detecting symbols in error means identifying a symbol in error, which includes its location in a codeword. In some situations when multiple errors occur in multiple codewords in a frame of codewords, it means identifying possible areas or locations of symbols of error within a codeword. In all cases detecting a symbol in error or symbols in error in the present invention mean identifying error locations that are more specific than just the codeword, unless specifically used in a different sense.

As illustrative examples, n-valued codes and coders have been provided that generate codes of p data symbols and k check symbols so that each codeword has at most (p−1) symbols at common with another codeword. These codes are optimal, in the sense that other codes can be generated so that a codeword of p data symbols and k check symbols have at most q symbols in common with another codeword from the set and wherein q<k+1. The optimal code can detect up to k symbols in error, while the sub-optimal code can detect less than k symbols in error. While optimal codes may usually be preferred, in some circumstances it may for instance require that one has to use n-valued logic wherein n is too high valued. One can then create codes which are perhaps sub-optimal in detection capabilities, but are close and can apply a more preferred value of n and n-valued logic.

In accordance with another aspect of the present invention, the n-valued symbols of a codeword are interleaved over a plurality of codewords. Interleaving provides a way to separate closely related symbols for instance by a predetermined and recoverable transposition of symbols over a sequence of symbols. Errors often occur in bursts. Such a burst may affect a group of symbols which are adjacent or close to each other. If all symbols affected by an error are in one word it may make the word unrecoverable. By interleaving symbols that are now adjacent or close are most likely from different words. Accordingly, a burst may still affect a number of symbols, but each affected symbol most likely belongs to a different word that still can be corrected.

Figure 12:
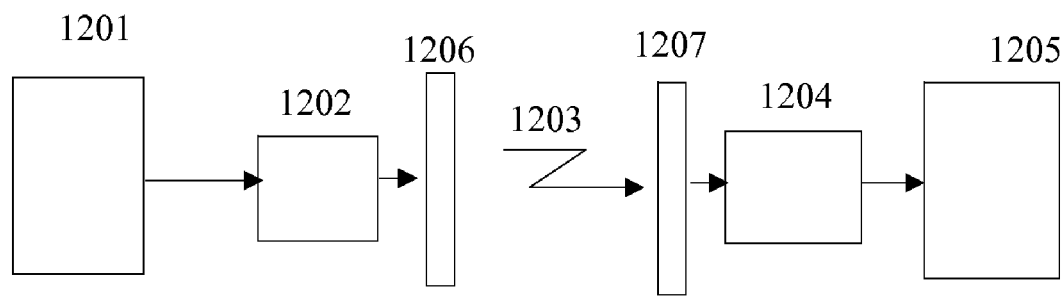
FIG. 12 illustrates a system that is used to perform the steps described herein in accordance with another aspect of the present invention.

In accordance with a further aspect of the present invention, the here provided methods of error correction by error detection and symbol reconstruction can be used in a system, such as a communication system. A communication system may be a wired system or a wireless system. Such a system may be used for data transmission, telephony, video or any other type of transfer of information. A diagram of such a system is provided in FIG. 12. Herein 1201 is a source of information. The information is provided to a coder 1202. The information provided to a coder 1202 may already be in a digital form. It may also be converted into digital form by the coder 1202. The coder 1202 creates the code words of a plurality of data symbols with added check symbols as described herein as another aspect of the present invention. The codewords are organized in such a way that up to a number of symbols in error can be identified as such. The thus created codewords may be provided directly to a medium 1203 for transmission. They may also be provided to a modulator/transmitter 1206 that will modify the digital coded signal provided by 1202 to a form that is appropriate for the medium 1203. For instance, 1206 may create an optical signal. Modulator 1206 may also be a radio transmitter, which will modulate the signal on for instance a carrier signal, and wherein 1203 is a radio connection.

At the receiving side a receiver 1207 may receive, amplify, and demodulate the signal coming from 1203 and provide a digital signal to a decoder 1204. The decoder 1204 first identifies if and which symbols are in error in accordance with another aspect of the present invention and then applies the methods provided herein to correct symbols in error. A decoded and error corrected signal is then provided to a target 1205. Such a target may be a radio, a phone, a computer, a tv set or any other device that can be a target for an information signal. A coder 1202 may also provide additional coding means, for instance to form a concatenated or combined code. In that case, the decoder 1204 has equivalent means to decode the additional coding. Additional information, such as synchronization, frame or ID information, may be inserted during the transmission and/or coding process.

Figure 13:
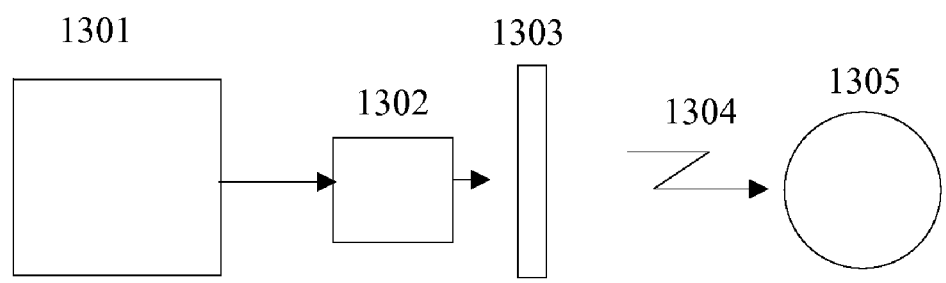
FIG. 13 illustrates a storage system for writing data to a storage medium in accordance with yet another aspect of the present invention.

In accordance with another aspect of the present invention, the here provided methods and apparatus for error correcting coding and decoding of signals can also be applied for systems and apparatus for storage of information. For instance, data stored on a CD, a DVD, a magnetic tape or disk or in mass memory in general may benefit from error correcting coding. A system for storing error correcting symbols in accordance with another aspect of the present invention is shown in diagram in FIG. 13. A source 1301 provides the information to be coded. This may be audio, video or any information data. The data may already be presented in n-valued symbols by 1301 or may be coded in such a form by 1302. Unit 1302 also creates the code words of a plurality of data symbols with added check symbols as described herein as another aspect of the present invention. Codewords are organized in such a way that up to a number of symbols in error can be identified as such. The thus created codewords may be provided directly to a channel 1304 for transmission to an information carrier 1305. In general, a modulator/data writer 1303 will be required to write a signal to a carrier 1305. For instance the channel requires optical signals or it may require magnetic or electro-magnetic or electro-optical signals. Modulator/data writer 1303 will create a signal that can be written via channel 1304 to a carrier 1305. Important additional information such as for ID and/or synchronization may be added to the data.

Figure 14:
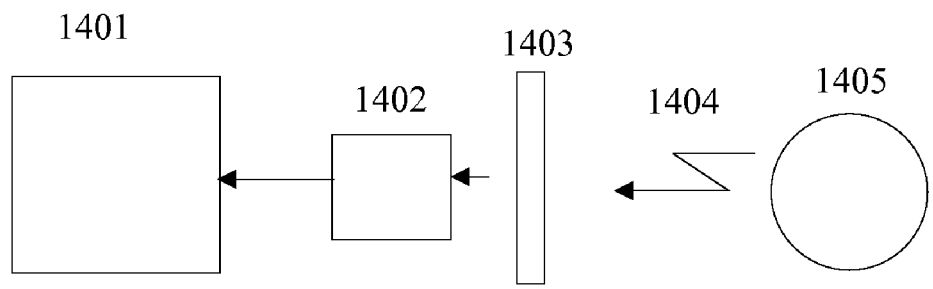
FIG. 14 illustrates a storage system for reading data from a storage medium in accordance with yet another aspect of the present invention.

FIG. 14 shows a diagram for error correcting decoding information read from a carrier 1405. The information is read through a channel 1404 (such as an optical channel or magnetic or electro-magnetic or electro-optical) and provided in general to a detector 1403 that will receive and may amplify and or demodulate the signal. The signal is then provided to a decoder 1402 where error detection and error correction takes place. The information signal, possibly readied for presentation as an audio or video signal or any other form, is then provided to a target. The target may be a video screen, a compute, a radio or any other device that can use the decoded signal.

N-valued check symbols as disclosed herein are generated from n-valued data symbols. There are different ways to calculate n-valued check symbols. In a first embodiment, a check symbol can be generated from an n-valued Linear Feedback Shift Register (LFSR). The LFSR may have adders and multipliers over GF(n). The LFSR may also have n-valued functions with no multipliers occurring in the n-valued LFSR. Furthermore, the check symbols may be generated by apparatus such as circuitry or by processors such as programmable processors or by dedicated processors that executes combinational n-valued logic expression without using LFSR or LFSR-like circuitry or programs. These non-LFSR methods may be called "direct methods".

The n-valued functions disclosed herein which may be included in n-valued expressions for generating check symbols, for solving errors or for locating errors can be implemented in processors. This may be programmable processors, dedicated processors. They may use memory based truth tables or switches and inverters that implement n-valued functions. A processor may also be binary processors wherein n-valued symbols are represented as words of binary symbols. An A/D converter may be applied to transform an n-valued symbol into a binary word; and a D/A converter may be applied to transform a binary word into an n-valued symbol. An n-valued symbol may thus be a single element. It may also be a word of p-valued symbols with p<n. Switching and processing may be in electronic form, in optical form, or any other physical form that implements n-valued states.

Figure 18:
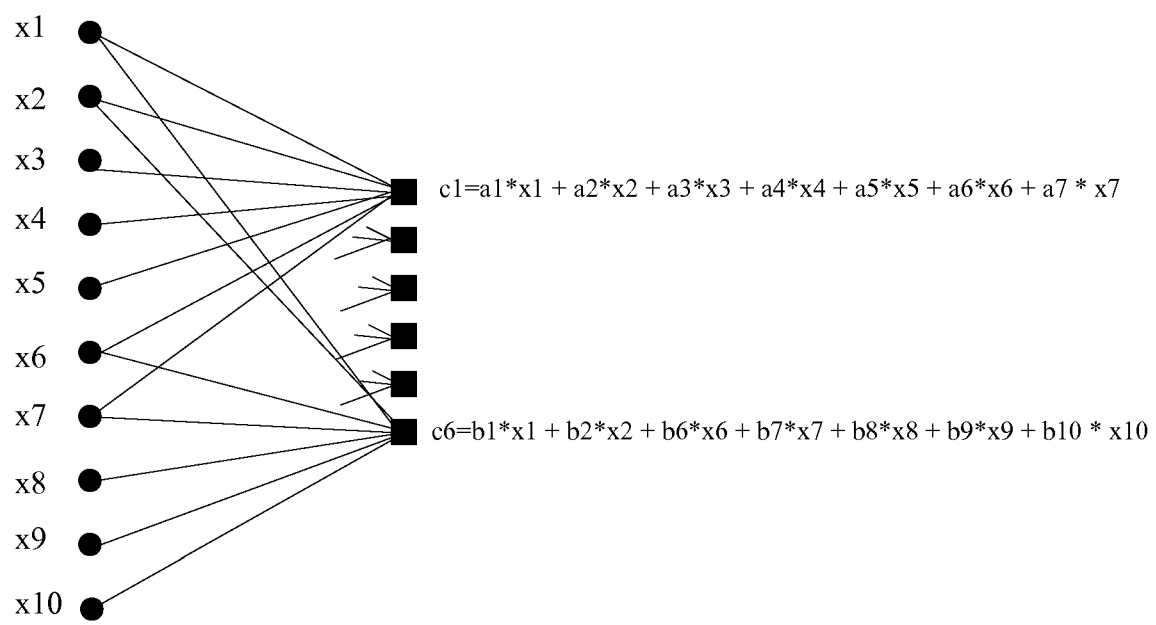
FIG. 18 illustrates coding a plurality of n-valued symbols in accordance with another aspect of the present invention.

In accordance with an aspect of the present invention, check symbols are generated in accordance with rows and columns of a matrix to generate a check symbol. This makes analysis of relations between check symbols easy to oversee. In accordance with another aspect of the present invention, one may also generate n-valued check symbols in a different way. For instance, an illustrative example is shown in FIG. 18. Herein different combinations of 10 n-valued data symbols are used to generate 6 different check symbols. For check symbol c1 and c6 the n-valued expressions are provided to generate the check symbols. Because one uses an n-valued basis one may use coefficients a1 ... a6 and b1, b2, b6, b7, b8, b9 and b10 which have a value or a state (1, 2, 3, ... n−1). The check symbols c2, ... , c5 have similar expressions, but are not shown in detail. Each data symbol of [x1 ... x10] should have has at least 2 check symbols in common with another data symbol so one may resolve errors by iterative methods. For instance, by assuming a value of a data symbol and going through different possibilities using received values until all possible equations of check symbols generate the correct outcome. Once all equations generate the correct values, one has corrected the errors, if not too many errors were assumed. While the symbols '+' and '*' are used for clarity these may also mean other functions than addition and multiplication. A '+' may be any reversible n-valued logic function. A '*' may be any n-valued reversible inverter.

In accordance with an aspect of the present invention, one may code a sequence of p n-valued data symbols by adding to the data symbols q check symbols. One may select from the p symbols q combinations with q<p of n-valued data symbols and create from each of the q combinations a check symbol and thus generate q check symbols. The combinations should be selected in such a way that each of the n-valued data symbols contributes to at least two check symbols. One can then transmit a codeword containing the p n-valued data symbols and the q n-valued check symbols. With q<<p one may call such a code a Low Density Check Symbol (LDCS) code. One may generate check symbols in different ways. Assume a combination of r n-valued symbols [x1, x2, ... , xr] to generate a check symbol 'cs'.

One may generate the check symbol 'cs' by substituting the value of the constituting symbol into an n-valued equation: cs=(a1 inv1 x1) sc1 (a2 inv2 x2) sc2 ... sc(r−1) (ar inv(r−1) xr). Herein, x1, x2, ... , xr represent a value or a state of an n-valued symbol. The terms a1, a2, ... ar are n-valued constants with which the values or states are adjusted in the equations. The terms inv1, inv2, ... inv(r−1) represent n-valued inverters. In one implementation inverters can all be a multiplication over GF(n). The terms sc1, sc2, ... sc(r−1) represent n-valued logic functions. In one implementation all functions can be an adder over GF(n). The inverters can be the same for each term or they can be different. They can be reversible or non-reversible. The n-valued functions can all be the same or they can be different. They can be reversible or non-reversible. For use in error correcting check symbols all functions are preferably reversible.

As an illustrative example one may use a set of 4-valued data symbols [x1, x2, x3, x4] and from this generated 3 check symbols [cs1, cs2, cs3] wherein cs1=cs1(x1,x2,x3); cs2=cs2 (x1,x2, x4) and cs3=cs3(x1, x3, x4). One may generate a check symbol by adding and multiplying over GF(n) or as a modulo-n operation.

However, in accordance with an aspect of the present invention, a check symbol may be generated as a result of an n-valued logic expression wherein not all operations are an addition and/or a multiplication. For instance, a 5-valued symbol may be generated using a reversible function sc5 of which the truth table is provided in the following table.

| sc5 | 0 | 1 | 2 | 3 | 4 |
|---|---|---|---|---|---|
| 0 | 0 | 4 | 3 | 2 | 1 |
| 1 | 4 | 3 | 2 | 1 | 0 |
| 2 | 3 | 2 | 1 | 0 | 4 |
| 3 | 2 | 1 | 0 | 4 | 3 |
| 4 | 1 | 0 | 4 | 3 | 2 |

Furthermore, each symbol may be modified according to an inverter inv, of which the truth table is provided in the following table.

| inv | 0 | 1 | 2 | 3 | 4 |
|---|---|---|---|---|---|
| 0 | 0 | 0 | 1 | 2 | 3 |
| 1 | 0 | 1 | 2 | 3 | 4 |
| 2 | 0 | 2 | 3 | 4 | 0 |
| 3 | 0 | 3 | 4 | 0 | 1 |
| 4 | 0 | 4 | 0 | 1 | 2 |

The inverters should be regarded as the columns of the table, wherein inv2 is the inverter column under symbol 2 which is [1 2 3 4 0].

Accordingly, one may generate a check symbol cs1 according to the following equations: cs1=inv2(x1) sc5 inv3(x2) sc5 inv4(x3). Assume that one has the sequence [1 2 3 4] to be coded. Then the generated check symbol cs1 is: cs1=inv2(1) sc5 inv3(2) sc5 inv4(3)=2 sc5 4 sc5 1=((2 sc5 4) sc5 1)=4 sc5 1=0. The function sc5 is non-commutative, and accordingly a pre-determined scheme for execution of the expression should be used.

One may transfer symbols to a receiver where the check symbols are recalculated. Occurring errors most likely affect the recalculated check symbols and create differences with the received check symbols, allowing the code to be used as an error detecting code. One may further analyze received symbols and recalculated check symbols and correct a number of errors that may have occurred.

One may reduce combinations of n-valued inverters and an n-valued logic function to a function with a modified truth table as was shown by the inventor in U.S. patent application Ser. No. 10/935,960, filed on Sep. 8, 2004, which is incorporated herein by reference. An expression for a check symbol cs1=inv2(x1) sc5 inv3(x2) sc5 inv4(x3) may then be replaced by sc1=x1 sc51×2 sc52, wherein sc51 and sc52 are the function sc5 modified in accordance with the inverters. This reduction may be applied to any expression having inverters and functions, including modulo-n adders and multipliers and adders and multipliers over GF(n). Accordingly, an n-valued expression created from adders and having at least one multiplier may be changed to an expression having at least one function not being an adder modulo-n or over GF(n). A function not being an adder over GF(n) or a modulo-n adder herein may be defined as an n-valued non-adder function.

N-valued symbols can be represented as individual symbols as was shown herein. A symbol is then a single element which is assigned one of states. An n-valued function is then represented by an n-valued truth table: being described as a truth table with single element n-valued symbols as input and a single element n-valued symbol as output. N-valued functions which have multipliers at an input or output can be reduced to an n-valued function having a single truth table and no multipliers or inverters, as is shown elsewhere by the inventor, for instance in U.S. patent application Ser. No. 10/935,960 filed on Sep. 8, 2004, which is incorporated herein by reference. In that case, it does not matter how n-valued symbols are represented, for instance by binary symbols. One may also represent an n-valued symbol in binary form. One in general then determines the parity of the binary representation of two n-valued symbols to determine an error. It should be apparent that using parity to detect errors is different from comparing n-valued symbols. For instance, a symbol may be represented by 8-bits or a byte. If two or four or six or eight bits in a byte are in error then the byte in error will have the same parity as the byte being not in error and a parity check will not detect a difference. Not using parity symbols of binary representations of n-valued symbols but comparing two n-valued symbols may be called "direct comparison".

It should be clear that data symbols and check symbols generally can not be transmitted as a matrix. Accordingly, after determining check symbols the data symbols and check symbols may be ordered in a sequential frame structure of which beginning and end can be determined and of which the structure is known at a receiving or decoding side. At the receiving or decoding side symbols can be extracted from the frame and arranged in such a way that the matrix form can be recognized, deconstructed and used to process the symbols.

While there have been shown, described and pointed, out fundamental novel features of the invention as applied to preferred embodiments thereof, it will be understood that various omissions and substitutions and changes in the form and details of the devices, systems and methods illustrated and in their operation may be made by those skilled in the art without departing from the spirit of the invention. It is the intention, therefore, to be limited only as indicated by the scope of the claims appended hereto.

The following patent applications, including the specifications, claims and drawings, are hereby incorporated by reference herein, as if they were fully set forth herein: (1) U.S. Non-Provisional patent application Ser. No. 10/935,960, filed on Sep. 8, 2004, entitled TERNARY AND MULTI-VALUE DIGITAL SCRAMBLERS, DESCRAMBLERS AND SEQUENCE GENERATORS; (2) U.S. Non-Provisional patent application Ser. No. 10/936,181, filed Sep. 8, 2004, entitled TERNARY AND HIGHER MULTI-VALUE SCRAMBLERS/DESCRAMBLERS; (3) U.S. Non-Provisional patent application Ser. No. 10/912,954, filed Aug. 6, 2004, entitled TERNARY AND HIGHER MULTI-VALUE SCRAMBLERS/DESCRAMBLERS; (4) U.S. Non-Provisional patent application Ser. No. 11/042,645, filed Jan. 25, 2005, entitled MULTI-VALUED SCRAMBLING AND DESCRAMBLING OF DIGITAL DATA ON OPTICAL DISKS AND OTHER STORAGE MEDIA; (5) U.S. Non-Provisional patent application Ser. No. 11/000,218, filed Nov. 30, 2004, entitled SINGLE AND COMPOSITE BINARY AND MULTI-VALUED LOGIC FUNCTIONS FROM GATES AND INVERTERS; (6) U.S. Non-Provisional patent application Ser. No. 11/065,836 filed Feb. 25, 2005, entitled GENERATION AND DETECTION OF NON-BINARY DIGITAL SEQUENCES; (7) U.S. Non-Provisional patent application Ser. No. 11/139,835 filed, May 27, 2005, entitled MULTI-VALUED DIGITAL INFORMATION RETAINING ELEMENTS AND MEMORY DEVICES; (8) U.S. Non-Provisional patent application Ser. No. 11/618,986, filed Jan. 2, 2007, entitled Ternary and Multi-Value Digital Signal Scramblers, Descramblers and Sequence Generators; (9) U.S. Non-Provisional patent application Ser. No. 11/679,316, filed Feb. 27, 2007, entitled METHODS AND APPARATUS IN FINITE FIELD POLYNOMIAL IMPLEMENTATIONS.

The invention claimed is:

1. A method for coding of a plurality of n-valued data symbols with n>2, comprising:
    a processor associating the plurality of n-valued data symbols with a first and a second 2-dimensional matrix; and
    the processor generating a plurality of check symbols along each dimension of the first and second matrix, each of the plurality of check symbols being generated by evaluating an n-valued logic expression wherein data symbols are variables.

2. The method as claimed in claim 1, wherein the n-valued logic expression uses an n-valued non-adder function.

3. The method as claimed in claim 1, further comprising:
    the processor receiving of the plurality of n-valued data symbols and the plurality of check symbols;
    the processor associating the plurality of received n-valued data symbols with the first and the second matrix;
    the processor generating a plurality of recalculated check symbols along each dimension of the first and the second matrix, each of the plurality of recalculated check symbols being generated by evaluating an n-valued logic expression wherein received data symbols are variables.

4. The method as claimed in claim 3, further comprising locating one or more symbols for error correction by applying only received and recalculated check symbols.

5. The method as claimed in claim 4, further comprising:
    error-correcting by applying an n-valued logic expression having a symbol for error correction as an unknown.

6. The method as claimed in claim 5, wherein the n-valued logic expression uses an n-valued non-adder function.

7. The method as claimed in claim 6, wherein the n-valued logic expression is part of applying Cramer's rule.

8. The method for error correction as claimed in claim 1, further comprising the processor applying check symbols generated in accordance with one or more additional matrices.

9. The method as claimed in claim 1, wherein an additional check symbol is generated by using an n-valued Linear Feedback Shift Register (LFSR).

10. The method as claimed in claim 1, further comprising:
    the processor generating one or more n-valued check symbols from the plurality of check symbols.

11. A system for coding a plurality of n-valued data symbols with $n \geq 2$, comprising:
    a coding processor, the coding processor operative to perform the steps of:
        associating the plurality of n-valued data symbols with a first and a second 2-dimensional matrix; and
        generating a plurality of check symbols along each dimension of the first and second matrix, each of the plurality of check symbols being generated by evaluating an n-valued logic expression wherein data symbols are variables.

12. The system as claimed in claim 11, wherein n>2.

13. The system as claimed in claim 11, further comprising:
a decoding processor, the decoding processor operative to perform the steps of:
    associating a plurality of received n-valued data symbols with the first and the second matrix;
    generating a plurality of recalculated check symbols along each dimension of the first and the second matrix, each of the plurality of recalculated check symbols being generated by evaluating an n-valued logic expression wherein received data symbols are variables.

14. The system as claimed in claim 13, further comprising locating one or more symbols for error correction by applying only received and recalculated check symbols.

15. The system as claimed in claim 14, further comprising error-correcting by evaluating an n-valued logic expression having the symbol for error correction as an unknown.

16. The system as claimed in claim 11, further comprising generating of additional check symbols from the plurality of check symbols.

17. The system as claimed in claim 16, further comprising correcting errors in the check symbols.

18. The system as claimed in claim 11, wherein the system is a data storage system.

19. The system as claimed in claim 11, wherein the system is a communication system.

20. The system as claimed in claim 11, wherein n-valued symbols are represented by binary symbols.

21. A method for coding a plurality of n-valued data symbols with n>2, comprising:
    generating a first n-valued check symbol from the first plurality of symbols selected from the plurality of n-valued data symbols;
    the processor generating a second n-valued check symbol from a second plurality of symbols selected from the plurality of n-valued data symbols, the first and the second plurality of n-valued data symbols having at least one n-valued data symbol in common; and
    the processor generating at least one check symbol by an n-valued logic expression using an n-valued non-adder function.

22. The method as claimed in claim 21, further comprising:
    the processor generating an additional n-valued check symbol from an additional plurality of symbols selected from the plurality of n-valued data symbols, the additional plurality of symbols having at least one n-valued data symbol in common with another plurality of symbols selected from the plurality of n-valued data symbols; and
    repeating the previous step until each symbol of the plurality of n-valued data symbols is associated with at least two check symbols.

* * * * *

UNITED STATES PATENT AND TRADEMARK OFFICE
CERTIFICATE OF CORRECTION

| | | |
|---|---|---|
| PATENT NO. | : 8,046,661 B2 | Page 1 of 1 |
| APPLICATION NO. | : 11/969560 | |
| DATED | : October 25, 2011 | |
| INVENTOR(S) | : Peter Lablans | |

It is certified that error appears in the above-identified patent and that said Letters Patent is hereby corrected as shown below:

Column 36, line 7, Claim 21, insert -- a processor -- before "generating".

Signed and Sealed this
Sixth Day of December, 2011

David J. Kappos
*Director of the United States Patent and Trademark Office*